(12) United States Patent
Cha et al.

(10) Patent No.: US 11,464,018 B2
(45) Date of Patent: Oct. 4, 2022

(54) ELECTRONIC DEVICE AND METHOD FOR SETTING TRANSMISSION PATH IN ELECTRONIC DEVICE

(71) Applicant: Samsung Electronics Co., Ltd., Suwon-si (KR)

(72) Inventors: Jaemoon Cha, Suwon-si (KR); Hyeyong Go, Suwon-si (KR); Kyujae Jang, Suwon-si (KR); Seongju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 17/301,360

(22) Filed: Mar. 31, 2021

(65) Prior Publication Data
US 2021/0329617 A1    Oct. 21, 2021

(30) Foreign Application Priority Data
Mar. 31, 2020 (KR) .................. 10-2020-0039410

(51) Int. Cl.
*H04W 88/10* (2009.01)
*H04W 72/04* (2009.01)

(52) U.S. Cl.
CPC ....... *H04W 72/048* (2013.01); *H04W 72/042* (2013.01); *H04W 72/044* (2013.01); *H04W 88/10* (2013.01)

(58) Field of Classification Search
CPC ............................ H04W 88/06; H04W 76/15
See application file for complete search history.

(56) References Cited

U.S. PATENT DOCUMENTS 9,515,615 B2    12/2016  Ichitsubo et al.
10,763,899 B1 *  9/2020  Cetinoneri .............. H03F 3/213
(Continued)

FOREIGN PATENT DOCUMENTS

KR    10-2012-0070347 A    6/2012
KR    10-2018-0092226 A    8/2018

OTHER PUBLICATIONS

International Search Report and Written Opinion of the International Searching Authority dated Jun. 25, 2021 in connection with International Application No. PCT/KR2021/003836, 7 pages.

*Primary Examiner* — Kevin Kim

(57) ABSTRACT

According to various embodiments, an electronic device may comprise a communication processor; at least one RFIC connected to the communication processor; a first RFFE circuit connected to the at least one RFIC and configured to process a first signal corresponding to a first communication network; and a second RFFE circuit connected to the at least one RFIC and configured to process a second signal corresponding to a second communication network, and the communication processor may be configured to: identify a maximum frequency bandwidth that is supportable in the first communication network based on information received from the first communication network, and if the identified maximum frequency bandwidth is identified as a frequency bandwidth that is capable of being processed via the second RFFE circuit, transmit, via the second RFFE circuit, a third signal to the first communication network. Other various embodiments are possible.

20 Claims, 17 Drawing Sheets

(56) References Cited

U.S. PATENT DOCUMENTS

| | | |
|---|---|---|
| 2012/0157029 A1 | 6/2012 | Matsuura |
| 2017/0034734 A1 | 2/2017 | Ahmadi |
| 2018/0115438 A1 | 4/2018 | Park et al. |
| 2019/0158137 A1 | 5/2019 | Brunel et al. |
| 2019/0182146 A1 | 6/2019 | Skog et al. |
| 2020/0021317 A1 | 1/2020 | Kim et al. |
| 2020/0305091 A1* | 9/2020 | Lee .................. H04W 52/0212 |
| 2020/0313714 A1* | 10/2020 | Ono ........................ H04B 1/40 |

* cited by examiner

ELECTRONIC DEVICE AND METHOD FOR SETTING TRANSMISSION PATH IN ELECTRONIC DEVICE

CROSS-REFERENCE TO RELATED APPLICATION

This application is based on and claims priority under 35 U.S.C. § 119 to Korean Patent Application No. 10-2020-0039410, filed on Mar. 31, 2020, in the Korean Intellectual Property Office, the disclosure of which is incorporated by reference herein in its entirety.

BACKGROUND

1. Field

Various embodiments of the present disclosure relate to an electronic device and a method to set a transmission path in the electronic device.

2. Description of Related Art

As mobile communication technologies have developed, portable terminals that provide various functions have become popular. Accordingly, an effort to develop a 5G communication system is being made in order to meet wireless data traffic demand which is increasing. In order to achieve a high data transmission rate, the 5G communication system considers implementation in a higher frequency band (e.g., a 25 to 60 GHz band, in addition to implementation in a high frequency band which has been used by a 3G communication system and a long term evolution (LTE) communication system, so as to provide a high data transmission speed.

For example, in order to mitigate path loss of a radio wave and increase a transmission distance of the radio wave in an mmWave band, the 5G communication system has discussed beamforming, massive MIMO, and full dimensional MIMO (FD-MIMO), array antenna, analog beam-forming, and large scale antenna technologies.

As a scheme of implementing a 5G communication, a standalone (SA) scheme and a non-stand alone (NSA) scheme are considered. The SA scheme may be a scheme of using only a new radio (NR) system, and the NSA scheme may be a scheme of using the NR system together with an existing LTE system. In the NSA scheme, a user equipment (UE) may use an eNB in an LTE system, and a gNB in an NR system. A technology that allows a user terminal to operate in different communication systems may be referred to as dual connectivity.

SUMMARY

In order for an electronic device to transmit a signal to a communication network (e.g., a base station), data generated from a processor or a communication processor in the electronic device may be signal processed via a radio frequency integrated circuit (RFIC) and a radio frequency front end (RFFE) circuit (hereinafter, referred to as "RFFE" for convenience) and then transmitted to the outside via an antenna.

An electronic device supporting a plurality of communication networks may provide a plurality of transmission paths (Tx paths) for signal transmission to each communication network. The plurality of Tx paths provided to support the plurality of communication networks in the electronic device may include a separate RFIC and/or RFFE circuit for each path.

For example, if the electronic device supports a first communication network (e.g., NR) and a second communication network (e.g., an LTE), the electronic device may include a first RFFE configured to process a signal which corresponds to the first communication network and a second RFFE configured to process a signal which corresponds to the second communication network. The first RFFE is designed to be suitable for processing the signal which corresponds to the first communication network, and the second RFFE is designed to be suitable for processing the signal which corresponds to the second communication network. So, if the first communication network and the second communication network are different communication networks, the first RFFE and the second RFFE may be differently configured corresponding to characteristics thereof.

Even though the first RFFE is designed to be suitable for processing the signal which corresponds to the first communication network, and the second RFFE is designed to be suitable for processing the signal which corresponds to the second communication network, it may be more advantageous to process the signal which corresponds to the first communication network via the second RFFE or to process the signal which corresponds to the second communication network via the first RFFE according to various situations.

Various embodiments may provide an electronic device supporting a plurality of communication networks which controls to transmit a signal via a transmission path other than a transmission path which is set by default corresponding to each communication network in consideration of a frequency bandwidth or power class information of each communication network and a transmission path setting method of the electronic device.

According to various embodiments, an electronic device may comprise a communication processor; at least one radio frequency integrated circuit (RFIC) connected to the communication processor; a first radio frequency front-end (RFFE) circuit connected to the at least one RFIC and configured to process a first signal corresponding to a first communication network; and a second RFFE circuit connected to the at least one RFIC and configured to process a second signal corresponding to a second communication network, and the communication processor may be configured to: identify a maximum frequency bandwidth that is supportable in the first communication network based on information received from the first communication network; and if the identified maximum frequency bandwidth is identified as a frequency bandwidth that is capable of being processed via the second RFFE circuit, transmit, via the second RFFE circuit, a third signal to the first communication network.

According to various embodiments, a method to set a transmission path in an electronic device comprising a communication processor, at least one radio frequency integrated circuit (RFIC) connected to the communication processor, a first radio frequency front-end (RFFE) circuit connected to the at least one RFIC and configured to process a first signal corresponding to a first communication network, and a second RFFE circuit connected to the at least one RFIC and configured to process a second signal corresponding to a second communication network may comprise identifying a maximum frequency bandwidth that is supportable in the first communication network based on information received from the first communication network; and based on a result that the identified maximum frequency bandwidth is identified as a frequency bandwidth that is capable of being processed via the second RFFE circuit, transmitting, via the second RFFE circuit, a third signal to the first communication network.

According to various embodiments, an electronic device may comprise a communication processor; at least one radio frequency integrated circuit (RFIC) connected to the communication processor; a first radio frequency front-end (RFFE) circuit connected to the at least one RFIC and configured to process a first signal corresponding to a first communication network; and a second RFFE circuit connected to the at least one RFIC and configured to process a second signal corresponding to a second communication network, wherein the communication processor is configured to: identify information related to a power class based on information that is received from the first communication network; identify a transmission path for a third signal to be transmitted to the first communication network based on the information related to the power class; and transmit, via the first RFFE circuit or the second RFFE circuit, the third signal to the first communication network according to the identified transmission path.

According to various embodiments, a method to set a transmission path in an electronic device comprising a communication processor, at least one radio frequency integrated circuit (RFIC) connected to the communication processor, a first radio frequency front-end (RFFE) circuit connected to the at least one RFIC and configured to process a first signal corresponding to a first communication network, and a second RFFE circuit connected to the at least one RFIC and configured to process a second signal corresponding to a second communication network may comprise identifying information related to a power class based on information that is received from the first communication network; identifying a transmission path for a signal to be transmitted to the first communication network based on the information related to the power class; and transmitting, via the first RFFE circuit or the second RFFE circuit, the third signal to the first communication network according to the identified transmission path.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
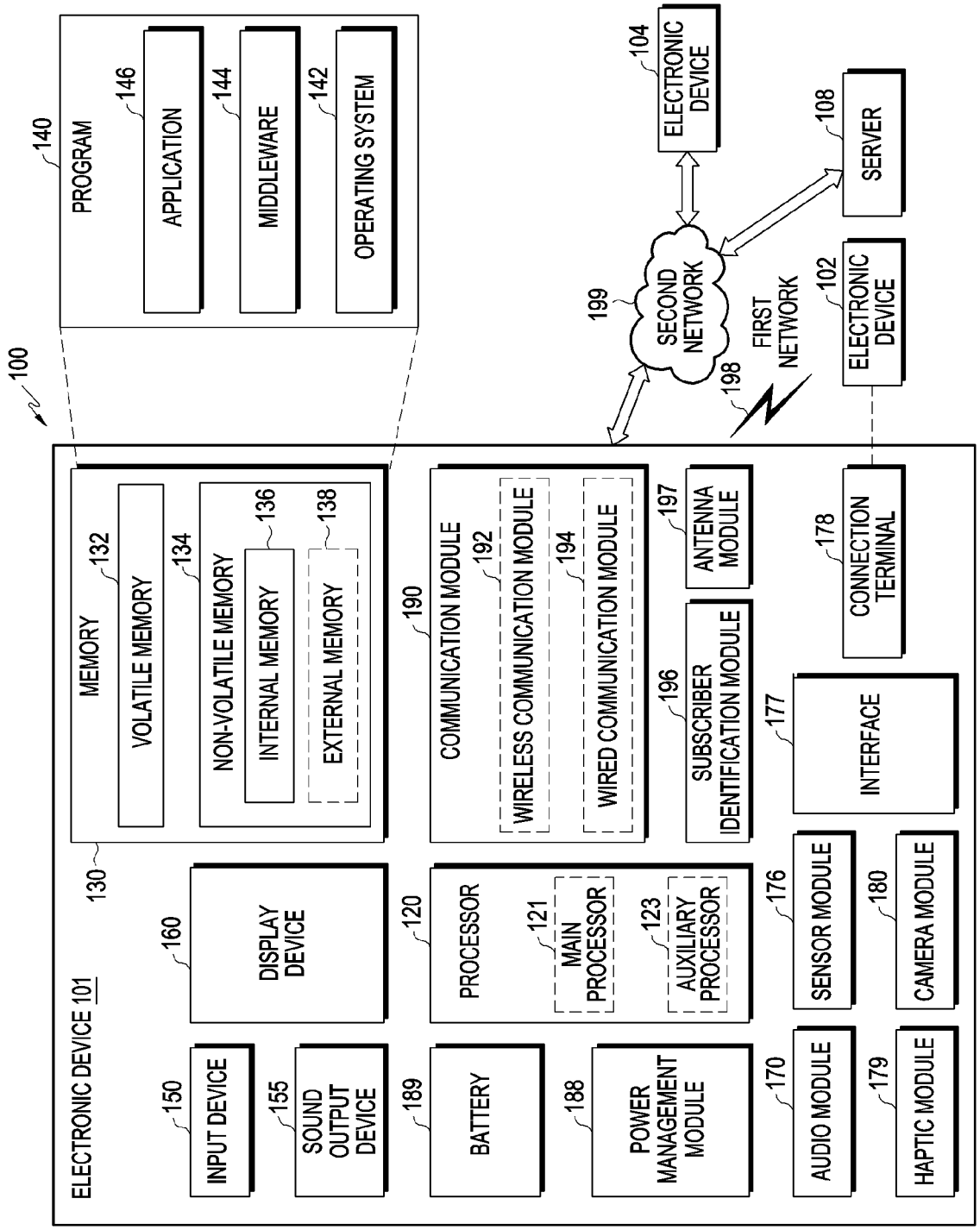
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
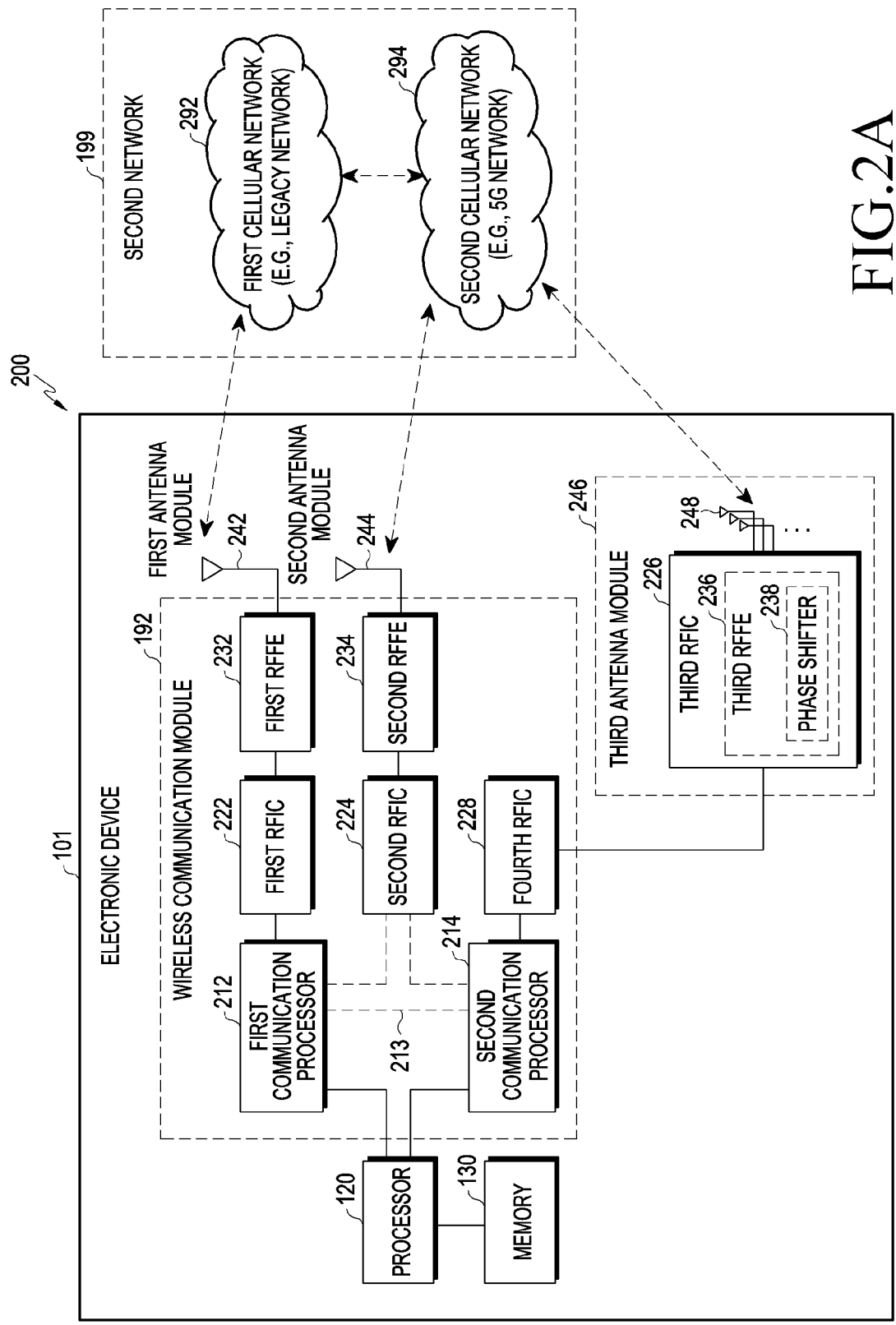
FIG. 2A is a block diagram illustrating an electronic device for supporting a legacy network communication and a 5G network communication according to various embodiments.

FIG. 2A is a block diagram 200 illustrating an electronic device 101 for supporting a legacy network communication and a 5$^{th}$ generation (5G) network communication according to various embodiments. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and an antenna 248. The electronic device 101 may further include a processor 120 and a memory 130. A second network 199 may include a first cellular network 292 and a second cellular network 294. According to another embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of a wireless communication module 192. According to another embodiment, the fourth RFIC 228 may be omitted or included as part of the third RFIC 226.

The first communication processor 212 may establish a communication channel in a band to be used for a wireless communication with the first cellular network 292 and support a legacy network communication via the established communication channel. According to various embodiments, the first cellular network 292 may be a legacy network including a $2^{nd}$ generation (2G), $3^{rd}$ generation (3G), $4^{th}$ generation (4G), or LTE network. The second communication processor 214 may establish a communication channel corresponding to a specified band (e.g., about 6 GHz to about 60 GHz) out of a band to be used for a wireless communication with the second cellular network 294 and support a 5G network communication via the established communication channel. According to various embodiments, the second cellular network 294 may be a 5G network defined by the 3GPP. Additionally, according to an embodiment, the first communication processor 212 or the second communication processor 214 may establish a communication channel corresponding to another specified band (e.g., about 6 GHz or less) out of the band to be used for the wireless communication with the second cellular network 294 and support a 5G network communication via the established communication channel.

The first communication processor 212 may transmit and receive data to and from the second communication processor 214. For example, data supposed to be transmitted via a second cellular network 294 may be scheduled to be transmitted via a first cellular network 292. In this case, the first communication processor 212 may receive transmission data from the second communication processor 214. For example, the first communication processor 212 may transmit and receive data to and from the second communication processor 214 via an inter-processor interface 213. The inter-processor interface 213 may be implemented as, for example, a universal asynchronous receiver/transmitter (UART) (e.g., high speed-UART (HS-UART)) or a peripheral component interconnect bus express (PCIe) interface, but a type thereof is not limited. Alternatively, the first communication processor 212 and the second communication processor 214 may exchange control information and packet data information by using, for example, a shared memory. The first communication processor 212 may transmit and receive various pieces of information such as sensing information, information about output strength, and resource block (RB) allocation information to and from the second communication processor 214.

Depending on their implementation, the first communication processor 212 may not be coupled directly to the second communication processor 214. In this case, the first communication processor 212 may transmit and receive data to and from the second communication processor 214 via the processor 120 (e.g., an application processor). For example, the first communication processor 212 and the second communication processor 214 may transmit and receive data to and from the processor 120 (e.g., an application processor) via an HS-UART interface or a PCIe interface, but a type of an interface is not limited. Alternatively, the first communication processor 212 and the second communication processor 214 may exchange control information and packet data information by using, for example, the processor 120 (e.g., the application processor) and the shared memory.

Figure 2B:
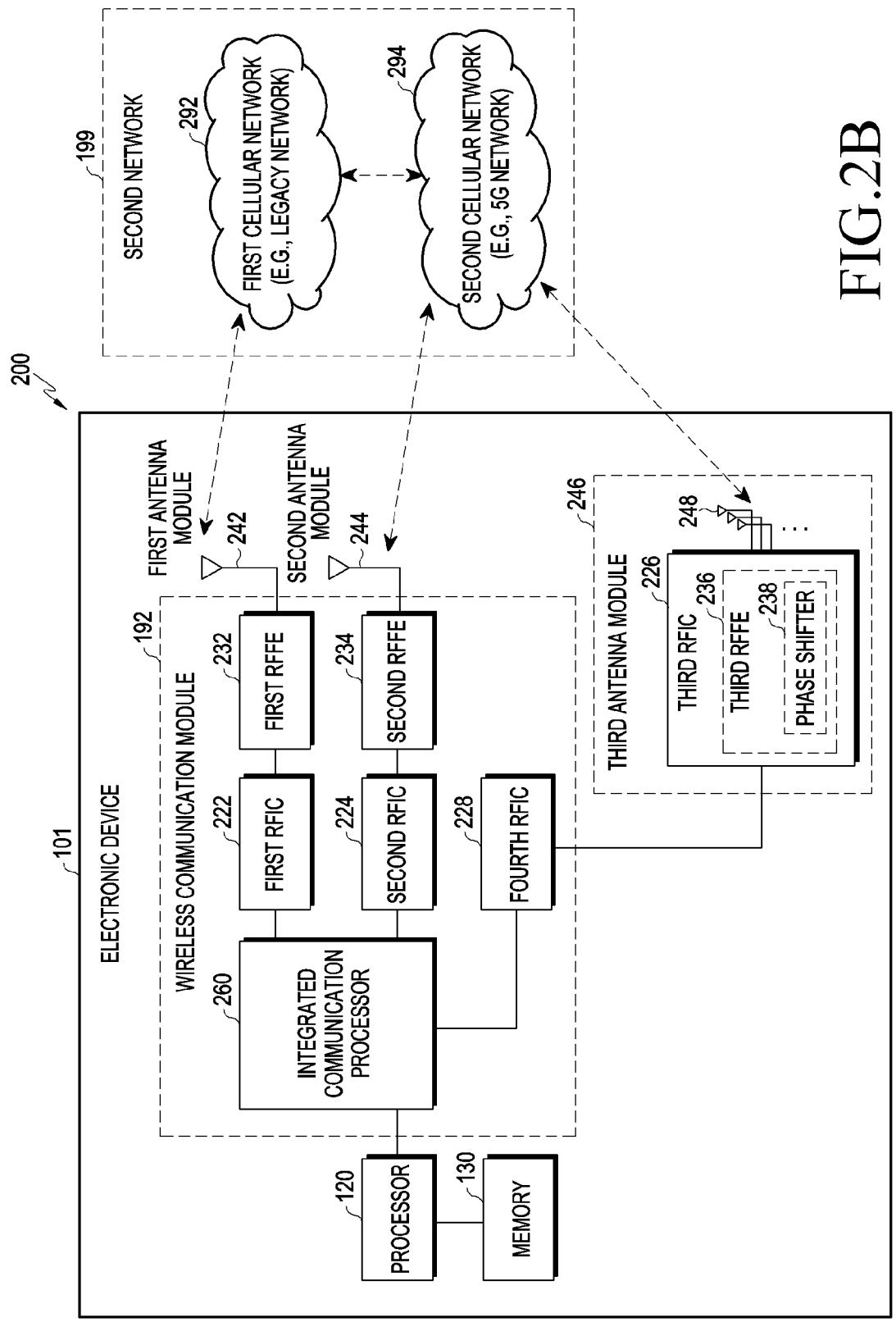
FIG. 2B is a block diagram illustrating an electronic device for supporting a legacy network communication and a 5G network communication according to various embodiments.

According to an embodiment, the first communication processor 212 and the second communication processor 214 may be incorporated in a single chip or a single package. According to various embodiments, the first communication processor 212 or the second communication processor 214 may be incorporated together with the processor 120, an auxiliary processor 123, or a communication module 190 in a single chip or a single package. For example, as illustrated in FIG. 2B, an integrated communication processor 260 may support all of functions for a communication with the first cellular network 292 and the second cellular network 294.

For transmission, the first RFIC 222 may convert a baseband signal generated by the first communication processor 212 to an RF signal in about 700 MHz to about 3 GHz used in the first cellular network 292 (e.g., the legacy network). For reception, an RF signal may be obtained from the first network 292 (e.g., the legacy network) via an antenna (e.g., the first antenna module 242) and pre-processed via an RFFE (e.g., the first RFFE 232). The first RFIC 222 may convert the pre-processed RF signal to a baseband signal so that the baseband signal may be processed by the first communication processor 212.

For transmission, the second RFIC 224 may convert a baseband signal generated by the first communication processor 212 or the second communication processor 214 to an RF signal in a Sub6 band (e.g., about 6 GHz or less) used in the second cellular network 294 (e.g., the 5G network). For reception, a 5G Sub6 RF signal may be obtained from the second cellular network 294 (e.g., the 5G network) via an antenna (e.g., the second antenna module 244) and pre-processed in an RFFE (e.g., the second RFFE 234). The second RFIC 224 may convert the pre-processed 5G Sub6 RF signal to a baseband signal so that the baseband signal may be processed by a corresponding one between the first communication processor 212 and the second communication processor 214.

For transmission, the third RFIC 226 may convert a baseband signal generated by the second communication processor 214 to an RF signal (hereinafter, referred to as, a 5G Above 6 RF signal) in a 5G Above 6 band (e.g., about 6 GHz to about 60 GHz) to be used in the second cellular network 294 (e.g., the 5G network). For reception, a 5G Above 6 RF signal may be obtained from the second cellular network 294 (e.g., the 5G network) via an antenna (e.g., the antenna 248) and pre-processed via the third RFFE 236. The third RFIC 226 may convert the pre-processed 5G Above 6 RF signal to a baseband signal so that the baseband signal may be processed by the second communication processor 214. According to an embodiment, the third RFFE 236 may be formed as part of the third RFIC 226.

According to an embodiment, the electronic device 101 may include the fourth RFIC 228 separately from or as part of the third RFIC 226. In this case, the fourth RFIC 228 may convert a baseband signal generated by the second communication processor 214 to an RF signal in an intermediate frequency band (e.g., about 9 GHz to about 11 GHz) (hereinafter, referred to as an intermediate frequency (IF) signal), and provide the IF signal to the third RFIC 226. The third RFIC 226 may convert the IF signal to a 5G Above 6 RF signal. During reception, a 5G Above 6 RF signal may be received from the second cellular network 294 (e.g., the 5G network) through an antenna (e.g., the antenna 248) and converted to an IF signal by the third RFIC 226. The fourth RFIC 228 may convert the IF signal to a baseband signal so that the baseband signal may be processed by the second communication processor 214.

According to an embodiment, the first RFIC 222 and the second RFIC 224 may be implemented as at least part of a single chip or a single package. According to various embodiments, if the first RFIC 222 and the second RFIC 224 are implemented as a single chip or a single package in FIG. 2A or 2B, the second RFIC 224 may be omitted. In this case, the first RFIC 222 is connected to the first RFFE 232 and the second RFFE 234, so the first RFIC 222 may convert a baseband signal into a signal of a band supported by the first RFFE 232 and/or the second RFFE 234, and transmit the converted signal to one of the first RFFE 232 and the second RFFE 234. According to an embodiment, the first RFFE 232 and the second RFFE 234 may be implemented as at least part of a single chip or a single package. According to an embodiment, at least one of the first antenna module 242 or the second antenna module 244 may be omitted or combined with the other antenna module to process RF signals in a plurality of corresponding bands.

According to an embodiment, the third RFIC 226 and the antenna 248 may be arranged on the same substrate to form a third antenna module 246. For example, the wireless communication module 192 or the processor 120 may be arranged on a first substrate (e.g., a main PCB). In this case, the third RFIC 226 may be arranged in a partial area (e.g., the bottom surface) of a second substrate (e.g., a sub PCB) other than the first substrate and the antenna 248 may be arranged in another partial area (e.g., the top surface) of the second substrate, to form the third antenna module 246. As the third RFIC 226 and the antenna 248 are arranged on the same substrate, it is possible to reduce length of a transmission line between the third RFIC 226 and the antenna 248. This may reduce, for example, loss (e.g., attenuation) of a signal in a high frequency band (e.g., about 6 GHz to about 60 GHz) used for a 5G network communication, on the transmission line. Therefore, the electronic device 101 may increase quality or a speed of a communication with the second network 294 (e.g., the 5G network).

According to an embodiment, the antenna 248 may be formed as an antenna array including a plurality of antenna elements which may be used for beamforming. In this case, for example, the third RFIC 226 may include a plurality of phase shifters 238 corresponding to the plurality of antenna elements, as part of the third RFFE 236. During transmission, each of the plurality of phase shifters 238 may change a phase of a 5G Above 6 RF signal to be transmitted to the outside of the electronic device 101 (e.g., a base station in the 5G network) via a corresponding antenna element. During reception, each of the phase shifters 238 may change a phase of a 5G Above 6 RF signal received from the outside via a corresponding antenna element to the same or substantially same phase. This enables transmission or reception via beamforming between the electronic device 101 and the outside.

The second cellular network 294 (e.g., the 5G network) may be operated independently of the first cellular network 292 (e.g., the legacy network) (e.g., stand-alone (SA)) or in connection to the first network 292 (e.g., the legacy network) (e.g., non-stand alone (NSA)). For example, the 5G network may include only an access network (e.g., a 5G radio access network (RAN) or next generation RAN (NG RAN)) without a core network (e.g., a next generation core (NGC)). In this case, after accessing the access network of the 5G network, the electronic device 101 may access an external network (e.g., an Internet) under the control of a core network (e.g., an evolved packet core (EPC)) of the legacy network. Protocol information for a communication with the legacy network (e.g., LTE protocol information) and protocol information for a communication with the 5G network (e.g., new radio (NR) protocol information) may be stored in the memory 230 and accessed by another component (e.g., the processor 120, the first communication processor 212, or the second communication processor 214).

Figure 3A:
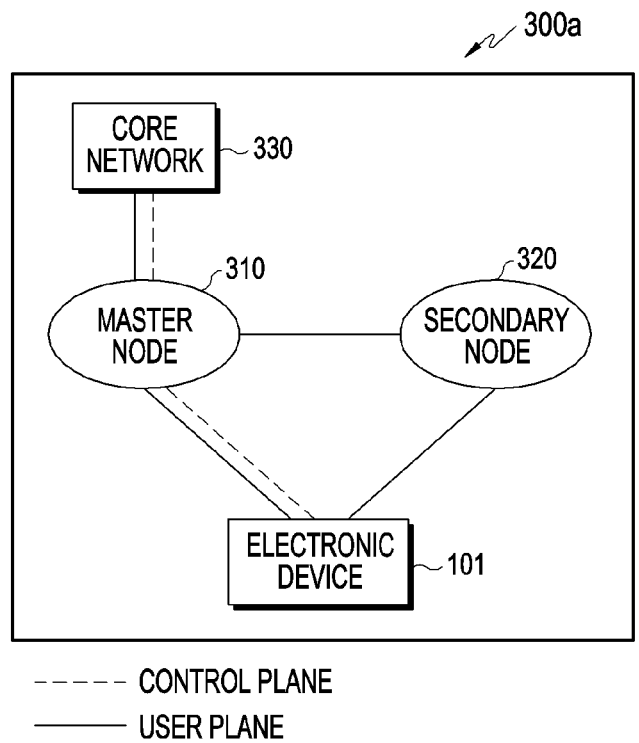
FIG. 3A is a diagram illustrating a wireless communication system which provides a legacy communication network and/or a 5G communication network according to various embodiments.
Figure 3B:
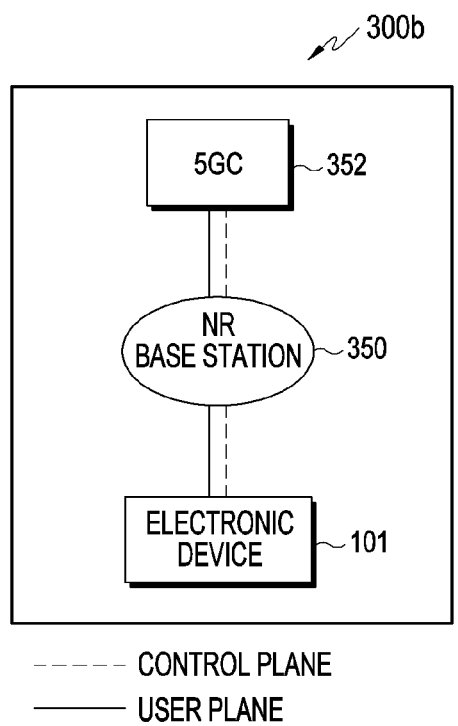
FIG. 3B is a diagram illustrating a wireless communication system which provides a legacy communication network and/or a 5G communication network according to various embodiments.
Figure 3C:
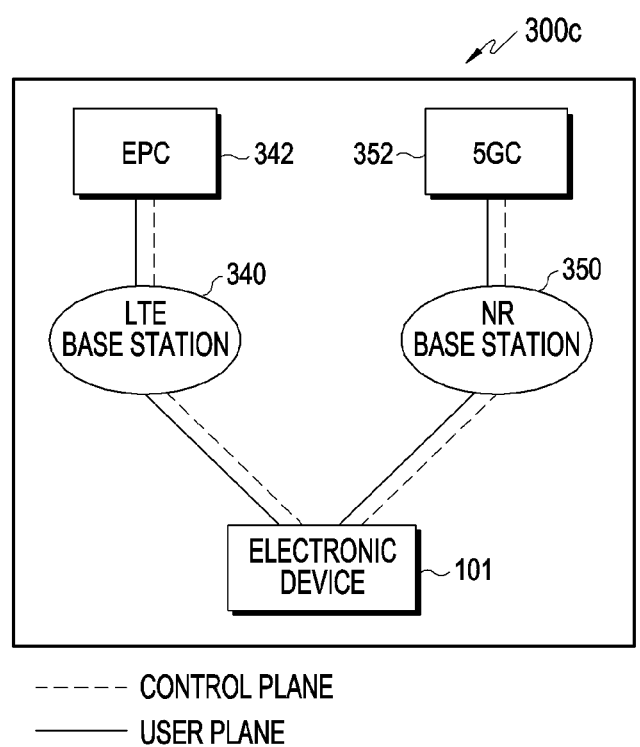
FIG. 3C is a diagram illustrating a wireless communication system which provides a legacy communication network and/or a 5G communication network according to various embodiments.

FIGS. 3A, 3B, and 3C are diagrams illustrating a wireless communication system which provides a legacy communication network and/or a 5G communication network. Referring to FIGS. 3A, 3B, and 3C, network environments 300a to 300c may include at least one of a legacy network or a 5G network. The legacy network may include, for example, a 4G or LTE base station 340 (e.g., an eNB or eNodeB) of the 3GPP standard supporting a wireless access of the electronic device 101, and an EPC 342 which manages a 4G communication. The 5G network may include, for example, an NR base station 350 (e.g., gNB or gNodeB) supporting a wireless access of the electronic device 101, and a 5th generation core (5GC) 352 which manages a 5G communication of the electronic device 101.

According to various embodiments, the electronic device 101 may transmit and receive a control message and user data via a legacy communication and/or 5G communication. The control message may include a message related to at least one of, for example, security control, bearer setup, authentication, registration, or mobility management of the electronic device 101. The user data may refer to, for example, user data except for a control message transmitted and received between the electronic device 101 and a core network 330 (e.g., the EPC 342).

Referring to FIG. 3A, the electronic device 101 according to an embodiment may transmit and receive at least one of a control message or user data to and from at least part (e.g., an NR base station 350 and a 5GC 352) of the 5G network using at least part (e.g., an LTE base station 340 and an EPC 342) of the legacy network.

According to various embodiments, the network environment 300a may include a network environment which provides wireless communication dual connectivity (DC) to the LTE base station 340 and the NR base station 350 and transmits and receives a control message to and from the electronic device 101 via one core network 330 of the EPC 342 or the 5GC 352.

According to various embodiments, in a DC environment, one of the LTE base station 340 and the NR base station 350 may operate as a master node (MN) 310 and the other may operate as a secondary node (SN) 320. The MN 310 may be connected to the core network 330 and transmit and receive a control message to and from the core network 330. The MN 310 and the SN 320 may be connected to each other via a network interface and transmit and receive a message related to management of a wireless resource (e.g., a communication channel) to and from each other.

According to various embodiments, the MN 310 may include the LTE base station 340, the SN 320 may include the NR base station 350, and the core network 330 may include the EPC 342. For example, a control message may be transmitted and received via the LTE base station 340 and the EPC 342, and user data may be transmitted via at least one of the LTE base station 340 or the NR base station 350.

According to various embodiments, the MN 310 may include the NR base station 350, the SN 320 may include the LTE base station 340, and the core network 330 may include the 5GC 352. For example, a control message may be transmitted and received via the NR base station 350 and the 5GC 352, and user data may be transmitted via at least one of the LTE base station 340 or the NR base station 350.

Referring to FIG. 3B, according to various embodiments, a 5G network may include an NR base station 350 and a 5GC 352, and independently transmit and receive a control message and user data to and from an electronic device 101.

Referring to FIG. 3C, according to various embodiments, each of a legacy network and a 5G network may independently provide data transmission and reception. For example, an electronic device 101 may transmit and receive a control message and user data to and from an EPC 342 via an LTE base station 340. For another example, the electronic device 101 may transmit and receive a control message and user data to and from a 5GC 352 via an NR base station 350.

According to various embodiments, the electronic device 101 may be registered in at least one of the EPC 342 or the 5GC 352, and transmit and receive a control message.

According to various embodiments, the EPC 342 and the 5GC 352 may interwork and manage a communication of the electronic device 101. For example, mobility information of the electronic device 101 may be transmitted and received via an interface between the EPC 342 and the 5GC 352.

As described above, dual connectivity via the LTE base station 340 and the NR base station 350 may be referred to as E-UTRA new radio dual connectivity (EN-DC).

Figure 4A:
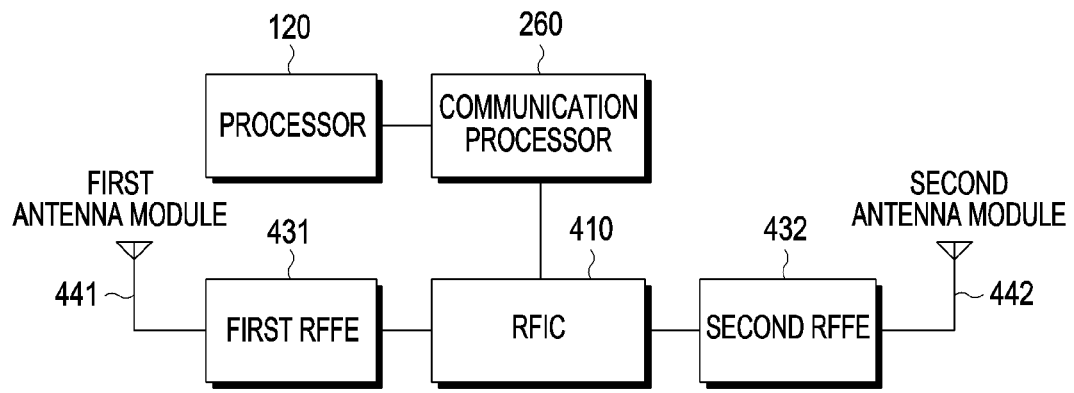
FIGS. 4A, 4B, and 4C are block diagrams illustrating an electronic device according to various embodiments.
Figure 4B:
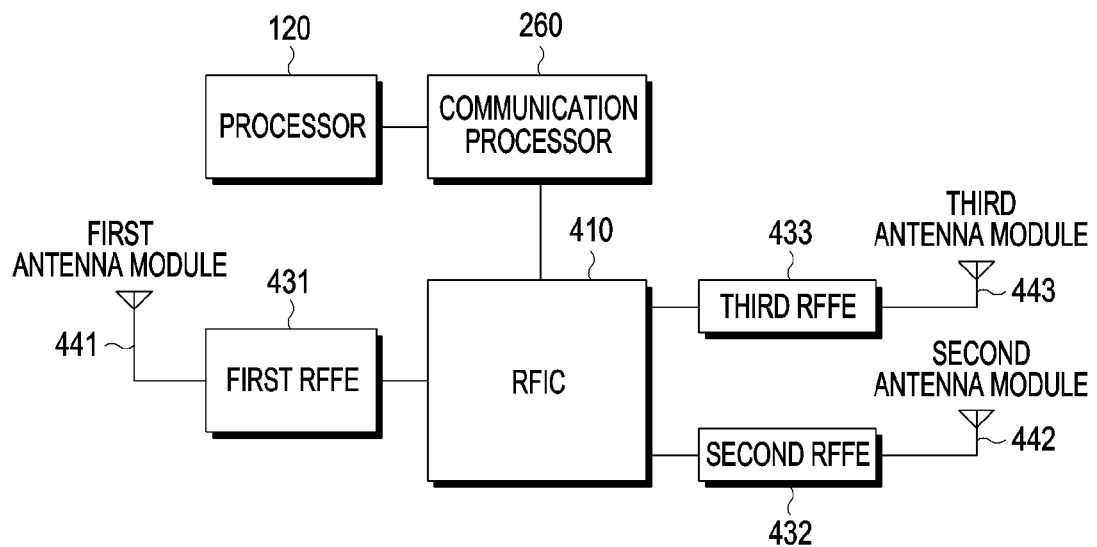
Figure 4C:
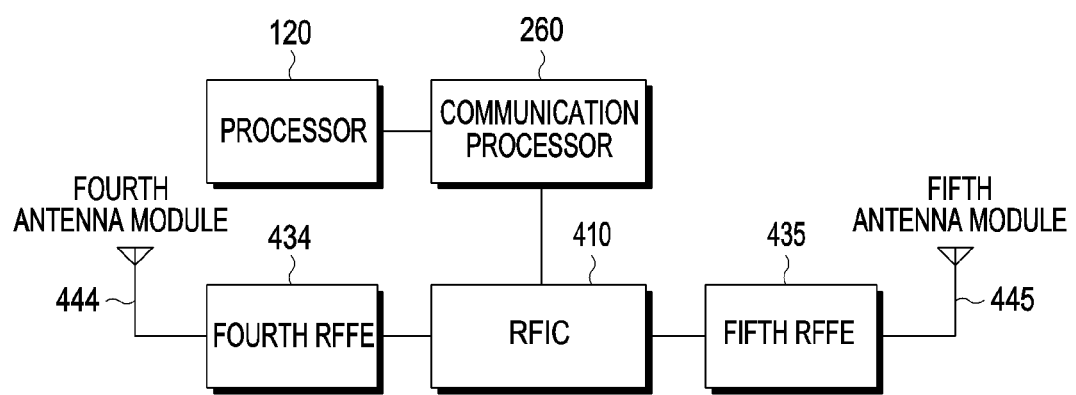

FIGS. 4A, 4B, and 4C are block diagrams illustrating an electronic device according to various embodiments. According to various embodiments, FIG. 4A illustrates an embodiment in a case that an electronic device 101 has two transmission paths (Tx paths) and operates in standalone (SA), FIG. 4B illustrates an embodiment in a case that the electronic device 101 has three Tx paths and operates in non-standalone (NSA), and FIG. 4C illustrates an embodiment in a case that the electronic device 101 has two Tx paths and operates in the NSA. Here, it is noted that the term "transmission path" may be used interchangeably with the term "Tx path."

Referring to FIG. 4A, an electronic device (e.g., the electronic device 101 in FIG. 1) according to various embodiments may include a processor 120, a communication processor 260, an RFIC 410, a first RFFE 431, a first antenna module 441, a second RFFE 432, and a second antenna module 442. For example, the first RFFE 431 may be disposed at a top in a housing of the electronic device 101, and the second RFFE 432 may be disposed at a bottom in the housing of the electronic device 101. However, various embodiments of the present disclosure are not limited to the disposition location as described above.

According to various embodiments, in a case of transmission, the RFIC 410 may convert a baseband signal generated by the communication processor 260 into a radio frequency (RF) signal which is used in a first communication network or a second communication network. For example, the RFIC 410 may transmit an RF signal used in the first communication network via the first RFFE 431 and the first antenna module 441, and transmit an RF signal used in the second communication network via the second RFFE 432 and the second antenna module 442.

According to various embodiments, in a case of reception, an RF signal may be obtained from the first communication network via the first antenna module 441 and then preprocessed via the first RFFE 431. The RFIC 410 may convert the RF signal preprocessed via the first RFFE 431 into a baseband signal so that the RF signal preprocessed via the first RFFE 431 may be processed by the communication processor 260. Further, an RF signal may be obtained from the second communication network via the second antenna module 442 and then preprocessed via the second RFFE 432. The RFIC 410 may convert the RF signal preprocessed via the second RFFE 432 into a baseband signal so that the RF signal preprocessed via the second RFFE 432 may be processed by the communication processor 260.

According to various embodiments, a Tx path for a signal transmitted from the RFIC 410 via the first RFFE 431 and the first antenna module 441 may be referred to as a first Tx path (Tx 1), and a Tx path for a signal transmitted from the RFIC 410 via the second RFFE 432 and the second antenna module 442 may be referred to as a second Tx path (Tx 2).

According to various embodiments, the first communication network and the second communication network may be different communication networks. For example, the first communication network may be a 5G network, and the second communication network may be a legacy network (e.g., an LTE network). If the first communication network is the 5G network, the first RFFE 431 may be designed to be suitable for processing a signal which corresponds to the 5G network, and the second RFFE 432 may be designed to be suitable for processing a signal which corresponds to the legacy network.

According to various embodiments, a frequency band of a signal transmitted via the first RFFE 431 and a frequency band of a signal transmitted via the second RFFE 432 may be the same, similar, or different. For example, the frequency band of the signal transmitted via the first RFFE 431 may be an N41 band (2.6 GHz) which is a frequency band of the 5G network, and the frequency band of the signal transmitted via the second RFFE 431 may be a B41 band (2.6 GHz) which is a frequency band of the LTE network. In this case, the first RFFE 431 and the second RFFE 432 may process a signal of the same or similar frequency band, but the first RFFE 431 may be designed to be capable of signal processing suitable for a characteristic of the 5G network, and the second RFFE 432 may be designed to be capable of signal processing suitable for a characteristic of the LTE network.

According to various embodiments, the first RFFE 431 may be designed to process a signal of a wider frequency bandwidth than the second RFFE 432. For example, the first RFFE 431 may be designed to process a frequency bandwidth of up to 100 MHz, and the second RFFE 432 may be designed to process a frequency bandwidth of up to 60 MHz.

According to various embodiments, the first RFFE 431 may further include additional components (e.g., a single pole double throw (SPDT) switch to transmit a sounding reference signal (SRS) signal, a filter to prevent interference between a WIFI signal of a band similar to a 5G signal and the 5G signal, a component to separate the WIFI signal from a received signal, and a duplexer to separate other 5G band signals from the received signal) different from the second RFFE 432 for signal processing suitable for the characteristic of the 5G network or for supporting multi-band. Because the first RFFE 431 further includes the additional components compared to the second RFFE 432, attenuation (e.g., path loss (PL)) occurred due to processing of a transmission signal may be greater. Here, the term "path loss" may be used interchangeably with the term "PL." For example, even though each of a power amplifier of the first RFFE 431 and a power amplifier of the second RFFE 432 is controlled so that a signal with the same power is transmitted in the RFIC 410, a path loss of the first RFFE 431 is greater than a path loss of the second RFFE 432, a magnitude of a signal transmitted via the first antenna module 441 may be less than a magnitude of a signal transmitted via the second antenna module 442.

Referring to Table 1, a current which is consumed if a signal of the N41 band which is a 5G band frequency signal is transmitted via the first RFFE 431 and a current which is consumed if the signal of the N41 band is transmitted via the second RFFE 432 may be compared.

TABLE 1

| | n41 | | First RFFE | Second RFFE | Delta |
|---|---|---|---|---|---|
| NR (CP OFDM) | n41 60 MHz 518598CH −50 dBm loss −16 | −20 dBm 0 dBm 10 dBm 15 dBm 20 dBm Max Power | 333 330 341 371 415 445 (21.8 dBm) | 269 271 284 311 340 352 (21.3 dBm) | −64 −59 −57 −60 −75 −93 |

For example, current consumed in a case that the N41 band signal is transmitted via the second RFFE 432 is about 2.5 to 3 dB less than current consumed in a case that the N41 band signal is transmitted via the first RFFE 432, so it may be identified that a difference between consumed currents in the two cases is at most 90 mA or more.

As described above, maximum power which may be transmitted in Tx paths may be set differently according to a difference in path loss. Table 2 shows maximum power reduction (MPR) defined for an LTE band signal, and Table 3 and Table 4 show MPR defined for an NR band signal. Table 3 shows MPR for a power class (PC) 3, and Table 4 shows MPR for a PC 2. Here, the term "power class" may be used interchangeably with the term "PC."

TABLE 2

| | Channel bandwidth/ Transmission bandwidth ($N_{RB}$) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | ≤5 | >4 | >8 | >12 | >16 | >18 | ≤2 |
| 64 QAM | ≤5 | ≤4 | ≤8 | ≤12 | ≤16 | ≤18 | ≤2 |
| 64 QAM | >5 | >4 | >8 | >12 | >16 | >18 | ≤3 |
| 256 QAM | | | ≥1 | | | | ≤5 |

TABLE 3

| | MPR (dB) | |
|---|---|---|
| Modulation | Outer RB allocations | Inner RB allocations |
| DFT-s-OFDM PI/2 BPSK | ≤0.5 | 0 |
| DFT-s-OFDM QPSK | ≤1 | 0 |
| DFT-s-OFDM 16 QAM | ≤2 | ≤1 |
| DFT-s-OFDM 64 QAM | | ≤2.5 |
| DFT-s-OFDM 256 QAM | | ≤4.5 |
| CP-OFDM QPSK | ≤3 | ≤1.5 |
| CP-OFDM 16 QAM | ≤3 | ≤2 |
| CP-OFDM 64 QAM | | ≤3.5 |
| CP-OFDM 256 QAM | | ≤6.5 |

TABLE 4

| | MPR (dB) | | |
|---|---|---|---|
| Modulation | Edge RB allocations | Outer RB allocations | Inner RB allocations |
| DFT-s-OFDM PI/2 BPSK | ≤3.5 | ≤0.5 | 0 |
| DFT-s-OFDM QPSK | ≤3.5 | ≤1 | 0 |
| DFT-s-OFDM 16 QAM | ≤3.5 | ≤2 | ≤1 |
| DFT-s-OFDM 64 QAM | ≤3.5 | | ≤2.5 |
| DFT-s-OFDM 256 QAM | | ≤4.5 | |
| CP-OFDM QPSK | ≤3.5 | ≤3 | ≤1.5 |
| CP-OFDM 16 QAM | ≤3.5 | ≤3 | ≤2 |
| CP-OFDM 64 QAM | | ≤3.5 | |
| CP-OFDM 256 QAM | | ≤6.5 | |

Referring to Tables 2 to 4, it may be identified that MPR in NR is set to be greater than MPR in LTE even though 64QAM as the modulation scheme is applied to both the LTE and the NR. For example, MPR backoff of an NR band signal is greater than MPR backoff of an LTE band signal, so maximum power which an electronic device may support for an NR band may be less than maximum power which the electronic device may support for an LTE band.

Referring back to FIG. 4A, according to various embodiments, in a case of intending to transmit an NR band signal (e.g., an N41 band signal), if the RFIC 410 transmits the NR band signal via the second RFFE 432 (e.g., if the RFIC 410 transmits the NR band signal via a second Tx path), a consumed current may be minimized compared to a case that the RFIC 410 transmits the NR band signal via the first RFFE 431 (e.g., a case that the RFIC 410 transmits the NR band signal via a first Tx path), so the RFIC 410 may increase maximum power and operate with the increased maximum power. For example, if the NR band intends to support a PC 2, the PC 2 may not be supported through transmission via the first RFFE 431 due to path loss, however, the PC 2 may be supported through transmission via the second RFFE 432.

According to various embodiments, when the electronic device 101 transmits an NR band signal (e.g., an N41 band signal) which the electronic device 101 intends to transmit via the RFIC 410, if the electronic device 101 needs to support a frequency bandwidth which may not be processed via the second RFFE 432, the electronic device 101 may set a path so that the RFIC 410 transmits the NR band signal via the first RFFE 431. However, the NR band signal (e.g., the N41 band signal) which the electronic device 101 intends to transmit via the RFIC 410 is a frequency bandwidth which may be processed via the second RFFE 432, the electronic device 101 may set a path so that the RFIC 410 transmits the NR band signal via the second RFFE 432 having relatively small path loss.

According to various embodiments, the electronic device 101 may set a priority between a first Tx path on which an NR band signal is transmitted via the first RFFE 431 and a second Tx path on which the NR band signal is transmitted via the second RFFE 432. For example, a path loss in a case that the NR band signal is transmitted via the second RFFE 432 may be less than a path loss in a case that the NR band signal is transmitted via the first RFFE 431. So, the electronic device 101 may set a priority of the second Tx path on which the NR band signal is transmitted via the second RFFE 432 higher than a priority of the first Tx path on which the NR band signal is transmitted via the first RFFE 432. Accordingly, a priority of the second RFFE 432 is higher than a priority of the first RFFE 431, so the electronic device 101 may be configured to transmit the NR band signal via the second RFFE 432 if signal processing is possible via the second RFFE 432 when transmitting the NR band signal. Information related to the priority set between the first Tx path and the second Tx path may be stored in a memory 130 of the electronic device 101 in advance.

According to various embodiments, the electronic device 101 may transmit a preset NR band signal (e.g., an N41 band signal) to the outside if the electronic device 101 is connected to the first communication network (e.g., the 5G network). The communication processor 260 of the electronic device 101 may identify a maximum frequency bandwidth (max bandwidth) from information received from the first communication network when the electronic device 101 is connected to the first communication network Here, it is noted that the term "maximum frequency bandwidth" may be used interchangeably with the term "max bandwidth." If the maximum frequency bandwidth is a bandwidth which may be processed in the second RFFE 432 having a relatively high priority (for example, if the maximum frequency bandwidth is 60 MHz), the electronic device 101 may be configured to transmit the NR band signal via the second RFFE 432. If the maximum frequency bandwidth is not the bandwidth which may be processed in the second RFFE 432 (for example, if the maximum frequency bandwidth is 100 MHz), the electronic device 101 may be configured to transmit the NR band signal via the first RFFE 431 which has a relatively low priority but may process the maximum frequency bandwidth.

According to various embodiments, even though a maximum frequency bandwidth received from the first communication network is set, a bandwidth of a resource (e.g., a resource block (RB)) allocated to the electronic device 101 based on uplink scheduling may be different from the maximum frequency bandwidth. For example, even though the second RFFE 432 does not support to process the maximum frequency bandwidth received from the first communication network, the second RFFE 432 may support the bandwidth of the resource which is allocated from the first communication network to the electronic device 101 based on the uplink scheduling. So, even though a Tx path via the first RFFE 431 is set according to the maximum frequency bandwidth identified when the electronic device 101 connects to the first communication network, a Tx path via the second RFFE 432 having a higher priority may be set for transmitting the NR bandwidth signal if the second RFFE 432 supports the bandwidth of the allocated resource according to resource allocation according to uplink scheduling after RRC connection.

Referring to FIG. 4B, an electronic device (e.g., an electronic device 101 in FIG. 1) according to various embodiments may include a processor 120, a communication processor 260, an RFIC 410, a first RFFE 431, a first antenna module 441, a second RFFE 432, a second antenna module 442, a third RFFE 433, and a third antenna module 443.

According to various embodiments, the RFIC 410, in a case of transmission, may convert a baseband signal generated by the communication processor 260 into a radio frequency (RF) signal which is used in a first communication network, a second communication network, or a third communication network. For example, the RFIC 410 may transmit an RF signal used in a first communication network via the first RFFE 431 and the first antenna module 441, transmit an RF signal used in a second communication network via the second RFFE 432 and the second antenna module 442, and transmit an RF signal used in a third communication network via the third RFFE 433 and the third antenna module 443.

According to various embodiments, in a case of reception, an RF signal may be obtained from the first communication network via the first antenna module 441 and preprocessed via the first RFFE 431. The RFIC 410 may convert the RF signal preprocessed via the first RFFE 431 into a baseband signal so that the RF signal preprocessed via the first RFFE 431 may be processed via the communication processor 260. Further, an RF signal may be obtained from the second communication network via the second antenna module 442 and preprocessed via the second RFFE 432. The RFIC 410 may convert the RF signal preprocessed via the second RFFE 432 into a baseband signal so that the RF signal preprocessed via the second RFFE 432 may be processed via the communication processor 260. Further, an RF signal may be obtained from the third communication network via the third antenna module 443 and preprocessed via the third RFFE 433. The RFIC 410 may convert the RF signal preprocessed via the third RFFE 433 into a baseband signal so that the RF signal preprocessed via the third RFFE 433 may be processed via the communication processor 260.

According to various embodiments, a Tx path for a signal transmitted from the RFIC 410 via the first RFFE 431 and the first antenna module 441 may be referred to as a first Tx path (Tx 1), a transmission path for a signal transmitted from the RFIC 410 via the second RFFE 432 and the second antenna module 442 may be referred to as a second Tx path (Tx 2), and a transmission path for a signal transmitted from the RFIC 410 via the third RFFE 433 and the third antenna module 443 may be referred to as a third Tx path (Tx 3).

According to various embodiments, the first communication network, the second communication network, and the third communication network may be the same or different communication networks. For example, the first communication network may be a 5G network, and the second and third communication networks may be a legacy network (e.g., an LTE network). According to various embodiments, even though the second communication network and the third communication network are the same LTE network, the second communication network and the third communication network may support communications for different frequency bands. For example, the second communication network may be a communication network which transmits and receives a high band LTE (e.g., a B41 band) signal, and the third communication network may be a communication network which transmits and receives a low band LTE (e.g., a B5 band, a B12 band, or a B71 band) signal. According to various embodiments, a frequency of the low band may be in a range of 0.6 GHz to 1.0 GHz, a frequency of a middle band (mid-band) may be in a range of 1.7 GHz to 2.2 GHz, and a frequency of the high band may be in a range of 2.3 GHz to 3.7 GHz, however, this is merely an example for better understanding, and various embodiments are not limited to the specific frequency ranges.

According to various embodiments, if the first communication network transmits and receives an N41 band signal of the 5G network, the first RFFE 431 may be designed to be suitable for processing a signal which corresponds to the 5G network, the second RFFE 432 may be designed to be suitable for processing a high-band LTE signal (e.g., a B41 band signal), and the third RFFE 433 may be designed to be suitable for processing a low-band LTE signal (e.g., a B5 band signal). At least one of the second RFFE 432 and the third RFFE 433 may be configured in a form of a power amplitude module including duplexer (PAMiD).

According to various embodiments, a frequency band for a signal transmitted via the first RFFE 431 and a frequency band for a signal transmitted via the second RFFE 432 may be the same, similar, or different. For example, the frequency band for the signal transmitted via the first RFFE 431 may be an N41 band (2.6 GHz) which is a frequency band of the 5G network, and the frequency band for the signal transmitted via the second RFFE 432 may be a B41 band (2.6 GHz) which is a frequency band of an LTE network. In this case, the first RFFE 431 and the second RFFE 432 may process signals of the same frequency band or similar frequency bands, however, the first RFFE 431 may be designed to be capable of performing signal processing suitable for a characteristic of the 5G network, and the second RFFE 432 may be designed to be capable of performing signal processing suitable for a characteristic of the LTE network.

According to various embodiments, the first RFFE 431 may be designed to process a signal of a wider frequency bandwidth than the second RFFE 432. For example, the first RFFE 431 may be designed to process a frequency bandwidth of up to 100 MHz, and the second RFFE 432 may be designed to process a frequency bandwidth of up to 60 MHz.

According to various embodiments, the first RFFE 431 may further include additional components (e.g., an SPDT switch for SRS signal transmission, a filter to prevent interference between a WIFI signal of a band similar to a 5G signal and the 5G signal, a component to separate the WIFI signal from a received signal, and a duplexer to separate other 5G band signals from the received signal) different from the second RFFE 432 for signal processing suitable for the characteristic of the 5G network or for supporting multi-band. Because the first RFFE 431 further includes the additional components compared to the second RFFE 432, attenuation (e.g., path loss) occurred due to processing of a transmission signal may be greater. For example, even though each of a power amplifier of the first RFFE 431 and a power amplifier of the second RFFE 432 is controlled so that a signal with the same power is transmitted in the RFIC 410, a path loss of the first RFFE 431 is greater than a path loss of the second RFFE 432, a magnitude of a signal transmitted via the first antenna module 441 may be less than a magnitude of a signal transmitted via the second antenna module 442.

Referring to FIG. 4B, according to various embodiments, the electronic device 101 may operate in EN-DC or NR E-UTRA dual connectivity (NE-DC) in which the electronic device 101 transmits an NR band signal (e.g., an N41 band signal) via the first RFFE 431, and transmits an LTE band signal (e.g., a B5 band signal) via the third RFFE 433 at the same time. For example, as illustrated in FIGS. 3A and 3C, the electronic device 101 may operate in the EN-DC in which the LTE band signal via the third RFFE 433 is transmitted to an LTE core 342 via the NE-DC in which the NR band signal via the first RFFE 431 is transmitted to a 5G core 352 of an NR via an NR base station 350.

According to various embodiments, in a case that the electronic device 101 intends to transmit an NR band signal (e.g., an N41 band signal) to the outside, if the RFIC 410 transmits the NR band signal via the second RFFE 432 (e.g., if the RFIC 410 transmits the NR band signal via a second Tx path), a consumed current may be minimized compared to a case that the RFIC 410 transmits the NR band signal via the first RFFE 431 (e.g., a case that the RFIC 410 transmits the NR band signal via a first Tx path), so the RFIC 410 may increase maximum power and operate with the increased maximum power. For example, if the NR band intends to support a PC 2, the PC 2 may not be supported through transmission via the first RFFE 431 due to path loss, however, the PC 2 may be supported through transmission via the second RFFE 432.

According to various embodiments, when the electronic device 101 operates in the EN-DC and transmits an NR band signal (e.g., an N41 band signal), if the electronic device 101 needs to support a frequency bandwidth which may not be processed via the second RFFE 432, the electronic device 101 may set a path so that the RFIC 410 transmits the NR band signal via the first RFFE 431. However, if the NR band signal (e.g., the N41 band signal) which the electronic device 101 intends to transmit via the RFIC 410 has a frequency bandwidth which may be processed via the second RFFE 432, the electronic device 101 may set a path so that the RFIC 410 transmits the NR band signal via the second RFFE 432 having relatively small path loss. In this case, the electronic device 101 may operate in the EN-DC by transmitting the NR band signal via the second RFFE 432, and transmitting the LTE band signal via the third RFFE 433 at the same time.

According to various embodiments, the electronic device 101 may set a priority between a first Tx path in which an NR band signal is transmitted via the first RFFE 431 and a second Tx path in which the NR band signal is transmitted via the second RFFE 432. For example, a path loss in a case that the NR band signal is transmitted via the second RFFE 432 may be less than a path loss in a case that the NR band signal is transmitted via the first RFFE 431. So, the electronic device 101 may set a priority of the second Tx path in which the NR band signal is transmitted via the second RFFE 432 higher than a priority of the first Tx path in which the NR band signal is transmitted via the first RFFE 432. Accordingly, the priority of the second RFFE 432 is higher than the priority of the first RFFE 431, so the electronic device 101 which operates in the EN-DC may be configured to transmit the NR band signal via the second RFFE 432 if signal processing is possible via the second RFFE 432 when transmitting the NR band signal.

According to various embodiments, after the electronic device 101 is connected to the second communication network (e.g., the LTE network), the electronic device 101 may operate in the EN-DC by simultaneously connecting to the first communication network (the 5G network) via the second communication network.

According to various embodiments, the electronic device 101 may transmit a preset NR band signal (e.g., an N41 band signal) to the outside if the electronic device 101 is connected to the first communication network (e.g., the 5G network). The communication processor 260 of the electronic device 101 may identify a maximum frequency bandwidth from information received from the first communication network if the electronic device 101 is connected to the first communication network via the second communication network. If the maximum frequency bandwidth is a bandwidth which may be processed in the second RFFE 432 having a relatively high priority (for example, if the maximum frequency bandwidth is 60 MHz), the electronic device 101 may be configured to transmit the NR band signal via the second RFFE 432. If the maximum frequency bandwidth is not the bandwidth which may be processed in the second RFFE 432 (for example, if the maximum frequency bandwidth is 100 MHz), the electronic device 101 may be configured to transmit the NR band signal via the first RFFE 431 which has a relatively low priority but may process the maximum frequency bandwidth.

According to various embodiments, even though a maximum frequency bandwidth received from the first communication network is set, a bandwidth of a resource (e.g., an RB) allocated to the electronic device 101 based on uplink scheduling may be different from the maximum frequency bandwidth. For example, even though the second RFFE 432 does not support to process the maximum frequency bandwidth received from the first communication network, the second RFFE 432 may support the bandwidth of the resource which is allocated from the first communication network to the electronic device 101 based on the uplink scheduling. So, even though a Tx path via the first RFFE 431 is set according to the maximum frequency bandwidth identified when the electronic device 101 connects to the first communication network, a Tx path via the second RFFE 432 having a higher priority may be set for transmitting the NR bandwidth signal if the second RFFE 432 supports the bandwidth of the allocated resource according to resource allocation according to uplink scheduling while the electronic device 101 operates in the EN-DC after RRC connection.

According to various embodiments, if the electronic device 101 operates in the EN-DC, the electronic device 101 may simultaneously transmit data via the first Tx path via the first RFFE 431 and the third Tx path via the third RFFE 433, or simultaneously transmit data via the second Tx path via the second RFFE 432 and the third Tx path via the third RFFE 433.

Referring to FIG. 4C, an electronic device (e.g., an electronic device 101 in FIG. 1) according to various embodiments may include a processor 120, a communication processor 260, an RFIC 410, a fourth RFFE 434, a fourth antenna module 444, a fifth RFFE 435, and a fifth antenna module 445.

According to various embodiments, the RFIC 410, in a case of transmission, may convert a baseband signal generated by the communication processor 260 into an RF signal which is used in a fourth communication network or a fifth communication network. For example, the RFIC 410 may transmit the RF signal used in the fourth communication network via the fourth RFFE 434 and the fourth antenna module 444, and transmit the RF signal used in the fifth communication network via the fifth RFFE 435 and the fifth antenna module 445.

According to various embodiments, in a case of reception, an RF signal may be obtained from the fourth communication network via the fourth antenna module 444 and pre-processed via the fourth RFFE 434. The RFIC 410 may convert the RF signal preprocessed via the fourth RFFE 434 into a baseband signal so that the RF signal preprocessed via the fourth RFFE 434 may be processed via the communication processor 260. Further, an RF signal may be obtained from the fifth communication network via the fifth antenna module 445 and preprocessed via the fifth RFFE 435. The RFIC 410 may convert the RF signal preprocessed via the fifth RFFE 435 into a baseband signal so that the RF signal preprocessed via the fifth RFFE 435 may be processed via the communication processor 260.

According to various embodiments, a Tx path for a signal transmitted from the RFIC 410 via the fourth RFFE 434 and the fourth antenna module 444 may be referred to as a fourth Tx path (Tx 4), and a Tx path for a signal transmitted from the RFIC 410 via the fifth RFFE 435 and the fifth antenna module 445 may be referred to as a fifth Tx path (Tx 5).

According to various embodiments, the fourth communication network and the fifth communication network may be the same communication network or different communication networks. For example, the fourth communication network may be a 5G network, and the fifth communication network may be a legacy network (e.g., an LTE network). For example, the fourth communication network may be a communication network which transmits and receives a mid/high band NR (e.g., an N41 band) signal, and the fifth communication network may be a communication network which transmits and receives a mid/high frequency band LTE (e.g., a B2 or B41 band) signa.

According to various embodiments, if the fourth communication network transmits and receives an N41 band signal of the 5G network, the fourth RFFE 434 may be designed to be suitable for processing a signal which corresponds to the 5G network, and the fifth RFFE 435 may be designed to be suitable for processing a mid/high band LTE signal (e.g., a B2 or B41 band signal). At least one of the fourth RFFE 434 and the fifth RFFE 435 may be configured in a form of a PAMiD.

According to various embodiments, a frequency band of a signal transmitted via the fourth RFFE 434 and a frequency band of a signal transmitted via the fifth RFFE 435 may be the same, similar, or different. For example, the frequency band of the signal transmitted via the fourth RFFE 434 may be an N41 band (2.6 GHz) which is a high band frequency of the 5G network, and the frequency band of the signal transmitted via the fifth RFFE 435 may be a B41 band (2.6 GHz) which is a high band frequency of the LTE network. In this case, the fourth RFFE 434 and the fifth RFFE 435 may process signals of the same frequency band or similar frequency bands, however, the fourth RFFE 434 may be designed to be capable of performing signal processing suitable for a characteristic of the 5G network, and the fifth RFFE 435 may be designed to be capable of performing signal processing suitable for a characteristic of the LTE network.

According to another embodiment, the frequency band of the signal transmitted via the fourth RFFE 434 may be an N41 band (2.6 GHz) which is a high band frequency of the 5G network, and the frequency band of the signal transmitted via the fifth RFFE 435 may be a B2 band (2.6 GHz) which is a mid-band frequency of the LTE network.

According to various embodiments, the fifth RFFE 435 is designed to be suitable for processing a mid/high band LTE signal (e.g., a B2 or B41 band signal), so the fourth RFFE 435 and the electronic device 101 may operate in various types of EN-DC. For example, the fourth RFFE 434 and the fifth RFFE 435 may be combined to operate in EN-DC of B2-N41, or operate in EN-DC of B41-N41.

According to various embodiments, the fourth RFFE 434 may be designed to process a signal of a wider frequency bandwidth than the fifth RFFE 435. For example, the fourth RFFE 434 may be designed to process a frequency bandwidth of up to 100 MHz, and the fifth RFFE 435 may be designed to process a frequency bandwidth of up to 60 MHz.

According to various embodiments, the fourth RFFE 434 may further include additional components (e.g., an SPDT switch for SRS signal transmission, a filter to prevent interference between a WIFI signal of a band similar to a 5G signal and the 5G signal a component to separate the WIFI signal from a received signal, and a duplexer to separate other 5G band signals from the received signal) different from the fifth RFFE 435 for signal processing suitable for the characteristic of the 5G network or for supporting multi-band. Because the fourth RFFE 434 further includes the additional components compared to the fifth RFFE 435, attenuation (e.g., path loss) occurred due to processing of a transmission signal may be greater. For example, even though each of a power amplifier of the fourth RFFE 434 and a power amplifier of the fifth RFFE 435 is controlled so that a signal with the same power is transmitted in the RFIC 410, a path loss of the fourth RFFE 434 is greater than a path loss of the fifth RFFE 435, a magnitude of a signal transmitted via the fourth antenna module 444 may be less than a magnitude of a signal transmitted via the fifth antenna module 445.

Referring to FIG. 4C, according to various embodiments, the electronic device 101 may operate in EN-DC in which an NR band signal (e.g., an N41 band signal) is transmitted via the fourth RFFE 434 and an LTE band signal (e.g., a B2 or B41 band signal) is transmitted via the fifth RFFE 435 at the same time.

According to various embodiments, in a case that the RFIC 410 intends to transmit the NR band signal (e.g., the N41 band signal), if the RFIC 410 transmits the NR band signal via the fifth RFFE 435 (e.g., if the RFIC 410 transmits the NR band signal via a fifth Tx path), a consumed current may be minimized compared to a case that the RFIC 410 transmits the NR band signal via the fourth RFFE 434 (e.g., a case that the RFIC 410 transmits the NR band signal via a fourth Tx path), so the RFIC 410 may increase maximum power and operate with the increased maximum power. For example, if the NR band intends to support a PC 2, transmission via the fourth RFFE 434 may not support the PC 2 due to path loss, however transmission via the fifth RFFE 435 may support the PC 2.

According to various embodiments, if the electronic device 101 needs to support a frequency bandwidth which may not be processed via the fifth RFFE 435 when the electronic device 101 operates in EN-DC and transmits an NR band signal (e.g., an N41 band signal), the electronic device 101 may set a path so that the RFIC 410 transmits the NR band signal via the fourth RFFE 434. However, if the NR band signal (e.g., the N41 band signal) which the electronic device 101 intends to transmit via the RFIC 410 has a frequency bandwidth which may be processed via the fifth RFFE 435, the electronic device 101 may set a path so that the RFIC 410 transmits the NR band signal via the fifth RFFE 435 having relatively small path loss. In this case, the electronic device 101 may operate in the EN-DC by transmitting the NR band signal via the fifth RFFE 435 and transmitting an LTE band signal (e.g., a B2 or B41 band signal) via the fourth RFFE 434.

According to various embodiments, the electronic device 101 may set a priority between a fourth Tx path on which the NR band signal is transmitted via the fourth RFFE 434 and a fifth Tx path on which the NR band signal is transmitted via the fifth RFFE 435. For example, a path loss in a case that the NR band signal is transmitted via the fifth RFFE 435 may be less than a path loss in a case that the NR band signal is transmitted via the fourth RFFE 434. So, the electronic device 101 may set a priority of the fifth Tx path in which the NR band signal is transmitted via the fifth RFFE 435 higher than a priority of the fourth Tx path in which the NR band signal is transmitted via the fourth RFFE 434. Accordingly, the priority of the fifth RFFE 435 is higher than the priority of the fourth RFFE 434, so the electronic device 101 which operates in the EN-DC may be configured to transmit the NR band signal via the fifth RFFE 435 if signal processing is possible via the fifth RFFE 435 when the electronic device 101 transmits the NR band signal.

According to various embodiments, after connecting to the fifth communication network (e.g., the LTE network), the electronic device 101 may operate in the EN-DC by simultaneously connecting to the fourth communication network (e.g., the 5G network) via the fifth communication network.

According to various embodiments, the electronic device 101 may transmit a preset NR band signal (e.g., an N41 band signal) if the electronic device 101 is connected to the fourth communication network (e.g., the 5G network). The communication processor 260 of the electronic device 101 may identify a maximum frequency bandwidth from information received from the fourth communication network if the electronic device 101 is connected to the fourth communication network via the fifth communication network. If the maximum frequency bandwidth is a bandwidth which may be processed in the fifth RFFE 435 having a relatively high priority (for example, if the maximum frequency bandwidth is 60 MHz), the electronic device 101 may be configured to transmit the NR band signal via the fifth RFFE 435. If the maximum frequency bandwidth is not the bandwidth which may be processed in the fifth RFFE 435 (for example, if the maximum frequency bandwidth is 100 MHz), the electronic device 101 may be configured to transmit the NR band signal via the fourth RFFE 434 which has a relatively low priority but may process the maximum frequency bandwidth.

According to various embodiments, even though a maximum frequency bandwidth received from the fourth communication network is set, a bandwidth of a resource (e.g., an RB) allocated to the electronic device 101 based on uplink scheduling may be different from the maximum frequency bandwidth. For example, even though the fifth RFFE 435 does not support to process the maximum frequency bandwidth received from the fifth communication network, the fifth RFFE 435 may support the bandwidth of the resource which is allocated from the fourth communication network to the electronic device 101 based on the uplink scheduling. So, even though a Tx path for the NR band signal (e.g., the N41 signal) is set to the fourth RFFE 434 according to a maximum frequency bandwidth identified when the electronic device 101 connects to the fourth communication network, a Tx path via the fifth RFFE 435 having a higher priority may be set for transmitting the NR bandwidth signal if the fifth RFFE 435 supports the bandwidth of the allocated resource according to resource allocation according to uplink scheduling while the electronic device 101 operates in the EN-DC after RRC connection.

According to various embodiments, in a case that the electronic device 101 operates in the EN-DC, the electronic device 101 may transmit the NR band signal via the fourth Tx path via the fourth RFFE 434 and transmit the LTE band signal via the fifth Tx path via the fifth RFFE 435 at the same time, or if set conditions as described above are satisfied (for example, if transmission of the NR band signal is possible via the fifth Tx path via the fifth RFFE 435), the electronic device 101 may transmit the NR band signal via the fifth Tx path via the fifth RFFE 435 and transmit the LTE band signal via the fourth Tx path via the fourth RFFE 434 at the same time.

Figure 5:
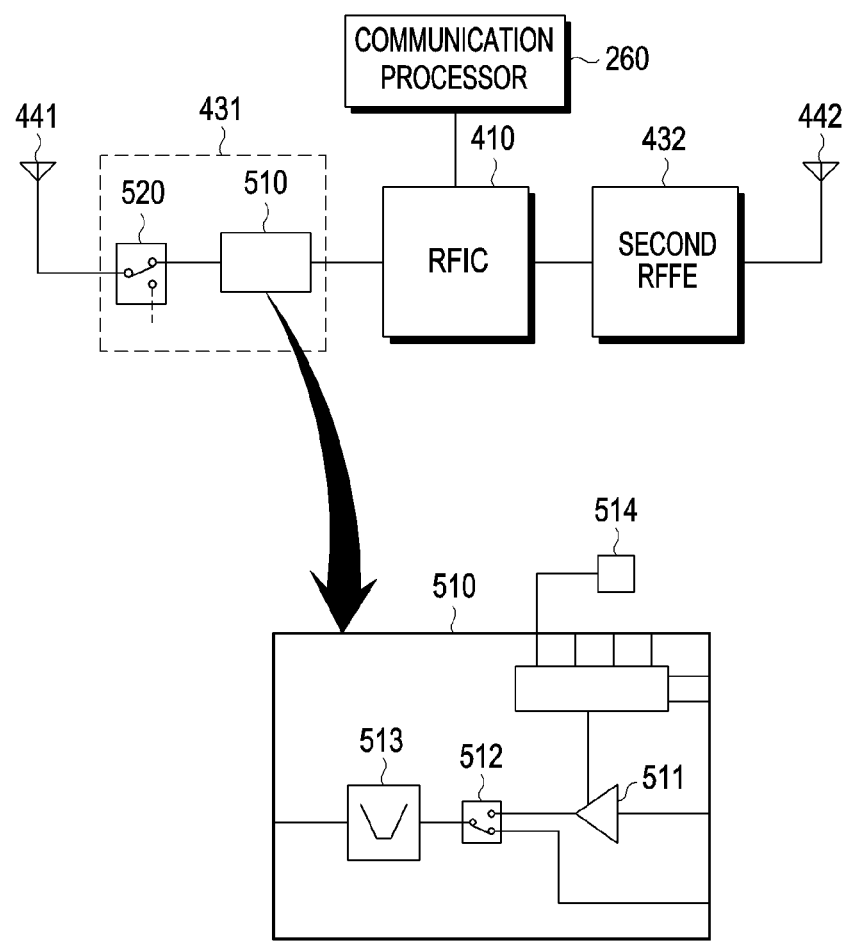
FIG. 5 is a detailed block diagram illustrating an electronic device according to various embodiments.

FIG. 5 is a detailed block diagram illustrating an electronic device according to various embodiments. Referring to FIG. 5, an electronic device (e.g., an electronic device 101 in FIG. 1) according to various embodiments may include a processor 120, a communication processor 260, an RFIC 410, a first RFFE 431, a first antenna module 441, a second RFFE 432, and a second antenna module 442.

According to various embodiments, the first RFFE 431 may further include additional components different from the second RFFE 432 for signal processing suitable for a characteristic of a 5G network or for supporting multi-band. For example, the first RFFE 431 may include a front end module (FEM) 510 and a first single pole double throw (SPDT) switch 520.

According to various embodiments, the FEM 510 may include a power amplifier (PA) 511, a switch 512, and a filter 513. According to various embodiments, the FEM 510 is connected to a PA envelop tracking IC (PA ET IC) 514 to amplify power according to an amplitude of a signal, thereby reducing a consumed current and generation of heat and improving a performance of the PA 511.

According to various embodiments, the first SPDT switch 520 may selectively output a first communication network signal (e.g., an N41 band signal) which is transmitted from the RFIC 410 via the first RFFE 431 to transmit the first communication network signal via the first antenna 441. For example, attenuation (e.g., PL) which occurs due to processing of a transmission signal by the first SPDT switch 520 for SRS transmission and components which are added for 5G signal processing or multi-band signal processing which are configured in the first RFFE 431 may be greater than attenuation which occurs due to the second RFFE 432. For example, even though each of a PA of the first RFFE 431 and a PA of the second RFFE 432 is controlled so that signals of the same power are transmitted in the RFIC 410, PL of the first RFFE 431 is greater than PL of the second RFFE 432, so a magnitude of a signal transmitted via the first antenna module 441 may be less than a magnitude of a signal transmitted via the second antenna module 442.

Figure 6:
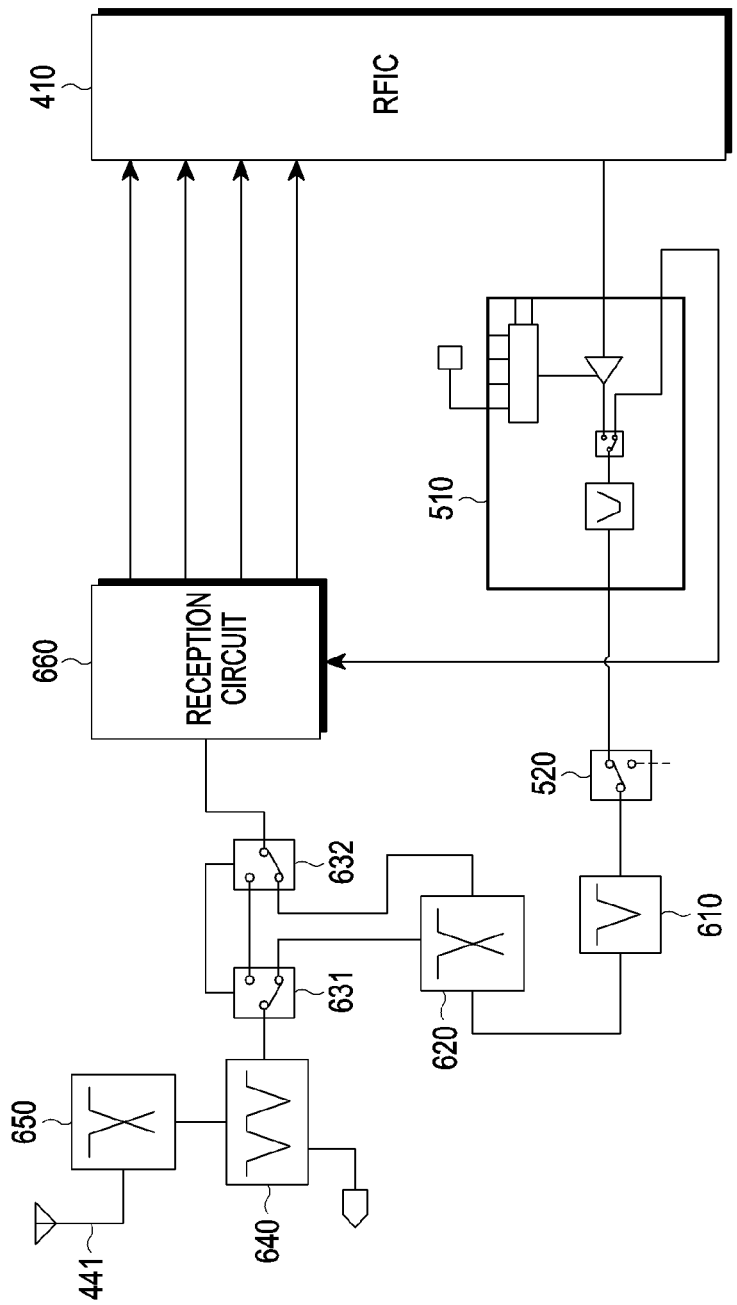
FIG. 6 is a detailed block diagram illustrating an electronic device according to various embodiments.

FIG. 6 is a detailed block diagram illustrating an electronic device according to various embodiments. Referring to FIG. 6, various components for signal processing may be further included in a first Tx path transmitted via a first communication network according to various embodiments.

For example, an electronic device may further include a first filter 610, a second filter 620, second SPDT switches 631 and 632, a third filter 640, and a fourth filter 650 in addition to a first SPDT switch 520 described in FIG. 5 in the first Tx path.

According to various embodiments, the first filter 610 may be a filter for preventing an NR band transmission signal from affecting a WIFI band signal (e.g., 5 GHz). In a case of an EN-DC combination such as N41-B2, the second filter 620 may be a filter for separating and transmitting an N41 signal and a diversity reception (DRx) signal of B2 according to each path. For example, the N41 signal may be transmitted to the third filter 640 via the switch #2-1 631, and the DRx signal of the B2 may be transmitted to an RFIC 410 after passing a reception circuit 660 via the switch #2-2 632. The reception circuit 660 may include at least one low noise amplifier (LNA).

According to various embodiments, the third filter 640 may separate a WIFI signal (e.g., a 2.4 GHz band signal) and a legacy signal, and the fourth filter 650 may separate another NR frequency band signal (e.g., an N79 band signal).

As illustrated in FIG. 6, as various components are added in the first Tx path configured for NR band signal transmission, path loss (PL) occurred in the first Tx path may be relatively large compared to PL occurred in a second Tx path via a second RFFE 432, so a consumed current may be large.

Figure 7:
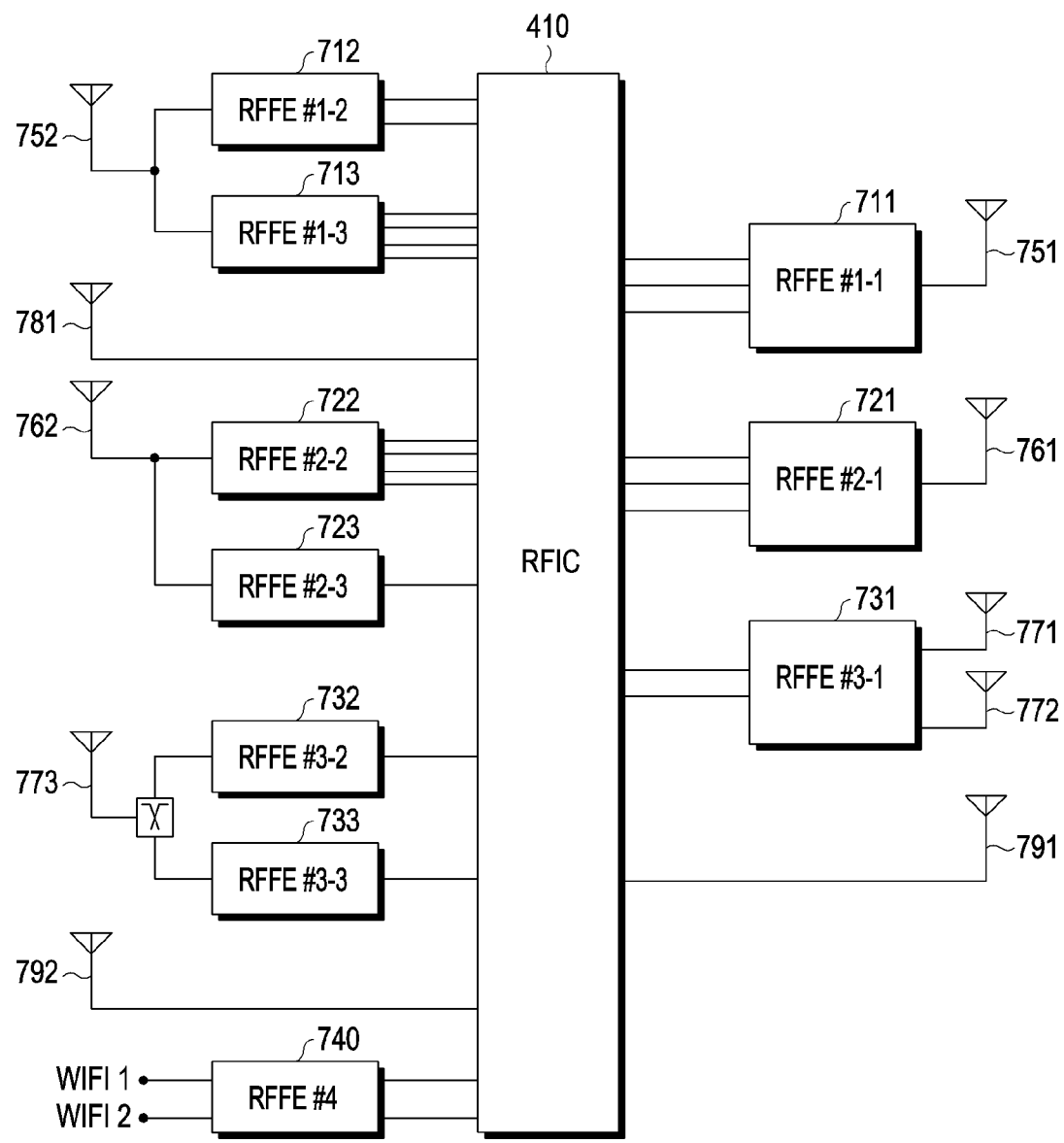
FIG. 7 is a block diagram illustrating an electronic device according to various embodiments.

FIG. 7 is a block diagram illustrating an electronic device according to various embodiments. Referring to FIG. 7, a plurality of RFFEs 711, 712, 713, 721, 722, 723, 731, 732, 733, and 740 may be connected to at least one RFIC 410. The plurality of RFFEs 711, 712, 713, 721, 722, 723, 731, 732, 733, and 740 may be connected to a plurality of antennas 751, 752, 761, 762, 771, 772, 773, 781, 791, and 792, respectively.

According to various embodiments, the RFFE #1-1 711 and the RFFE #2-1 721 may be connected to a first main antenna 751 and a second main antenna 761, respectively. The RFFE #1-2 712 and the RFFE #1-3 713 may be connected to a first sub antenna 752 and provide diversity with the first main antenna 751. The RFFE #2-2 722 and the RFFE #2-3 723 may be connected to a second sub antenna 762 and provide diversity with the second main antenna 761. The RFFE 731 #3-1 may be connected to two third main antennas 771 and 772 and provide MIMO. Further, the RFFE #3-2 732 and the RFFE #3-3 733 may be connected to a third sub antenna 773 via a duplexer and provide MIMO or diversity with the third main antennas 771 and 772. The antenna #5 781 may be directly connected to the RFIC 410 without passing through an RFFE. The antenna #6-1 791 and the antenna #6-2 792 may also be directly connected to the RFIC 410 without passing through RFFE, and provide MIMO or diversity via two antennas. The RFFE #4 740 may be connected to two WIFI antennas.

According to various embodiments, at least one of the RFFEs in FIG. 7 may correspond to one of a first RFFE 431, a second RFFE 432, a third RFFE 433, a fourth RFFE, and a fifth RFFE 435 described in FIGS. 4A, 4B, and 4C. At least one of the antennas in FIG. 7 may correspond to one of a first antenna module 441, a second antenna module 442, a third antenna module 443, a fourth antenna module 444, and a fifth antenna module 445 described in FIGS. 4A, 4B, and 4C.

Figure 8:
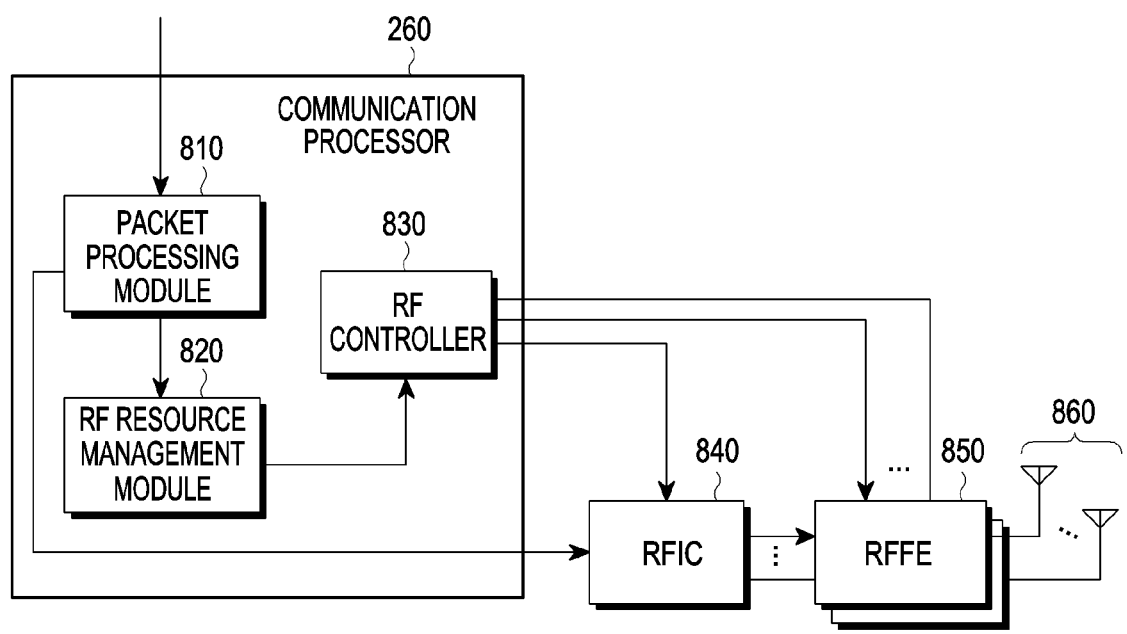
FIG. 8 is a block diagram illustrating a detailed structure of a communication processor according to various embodiments.

FIG. 8 is a block diagram illustrating a detailed structure of a communication processor according to various embodiments. Referring to FIG. 8, according to various embodiments, an electronic device 101 may include a processor 120, a communication processor 260, at least one RFIC 840, a plurality of RFFEs 650, and at least one antenna 860. The communication processor 260 may include a packet processing module 810, an RF resource management module 820, and an RF controller 830. According to various embodiments, the packet processing module 810 and/or the RF resource management module 820 may be implemented in software or hardware. For example, if the packet processing module 810 and/or the RF resource management module 820 are implemented in the software, the packet processing module 810 and/or the RF resource management module 820 may be executed by a program code set in the communication processor 260.

According to various embodiments, if the electronic device 101 accesses a communication network (e.g., a first communication network), a data Tx path for the first communication network may be set to a preset Tx path (e.g., a first Tx path). The communication processor 260 may process packet data received from the communication network via the packet processing module 810. The packet processing module 810 may perform processing per layer on packets which are transmitted and received via the electronic device 101 according to a designated wireless communication protocol.

According to various embodiments, the communication processor 260 may process base station-related information (e.g., a master information block (MIB), a system information block (SIB), or information included in an RRC access message) received from the communication network via the packet processing module 810 to identify maximum bandwidth information or band class information for the corresponding communication network. The maximum bandwidth information processed via the packet processing module 810 may be provided to the RF resource management module 820.

According to various embodiments, the RF resource management module 820 may identify the maximum bandwidth information provided from the packet processing module 810 and identify a Tx path for each frequency band signal. For example, a Tx path for an NR band signal may be set to a first Tx path as a default value. According to various embodiments, if it is identified that the RF resource management module 820 is capable of transmitting the NR band signal via a second Tx path according to the maximum bandwidth information, the Tx path for the NR band signal may be changed to a second Tx path.

According to various embodiments, the RF resource management module 820 may transmit information about the identified Tx path to the RF controller 830. The RF controller 830 may receive the information about the Tx path for the NR band signal from the RF resource management module 820, and control each of the RFIC 840 and one or more RFFEs 850 so that the NR band signal is transmitted according to the information about the Tx path. According to various embodiments, the RF controller 830 may include a driver for controlling each of the RFIC 840 and/or at least one RFFE 850.

According to various embodiments, the NR band signal may be processed by the packet processing module 810 according to the wireless communication protocol and then transmitted to the RFIC 840. The NR band signal to be transmitted to the RFIC 840 may be transmitted via the first Tx path or the second Tx path according to Tx path control of the RF controller 830.

According to one of various embodiments, an electronic device may comprise a communication processor; at least one radio frequency integrated circuit (RFIC) connected to the communication processor; a first radio frequency front-end (RFFE) circuit connected to the at least one RFIC and configured to process a first signal corresponding to a first communication network; and a second RFFE circuit connected to the at least one RFIC and configured to process a second signal corresponding to a second communication network, wherein the communication processor is configured to: identify a maximum frequency bandwidth that is supportable in the first communication network based on information received from the first communication network; and if the identified maximum frequency bandwidth is identified as a frequency bandwidth that is capable of being processed via the second RFFE circuit, transmit, via the second RFFE circuit, a third signal to the first communication network.

According to various embodiments, the maximum frequency bandwidth may be identified from a master information block (MIB) or a system information block (SIB) that is transmitted from the first communication network.

According to various embodiments, the communication processor may be configured to: identify uplink resource allocation information from the information that is received from the first communication network; and if a size of an uplink frequency resource allocated according to the identified uplink resource allocation information is identified as a size of a frequency resource that is capable of being processed via the second RFFE circuit, transmit, via the second RFFE circuit, the third signal to the first communication network.

According to various embodiments, the size of the uplink frequency resource may be identified by a number of resource blocks.

According to various embodiments, the uplink resource allocation information may be identified from a downlink control information (DCI) transmitted from the first communication network.

According to various embodiments, the communication processor may be configured to: identify whether there is a fourth signal to be transmitted to the second communication network; and if there is no fourth signal to be transmitted to the second communication network, transmit, via the RFFE circuit, the signal to the first communication network.

According to various embodiments, the communication processor may be configured to: when transmitting, via the second RFFE circuit, the third signal to the first communication network, transmitting, via the first RFFE circuit, a fourth signal to the second communication network.

According to various embodiments, the first RFFE circuit may include a path loss greater than the second RFFE circuit.

According to one of various embodiments, an electronic device may comprise a communication processor; at least one radio frequency integrated circuit (RFIC) connected to the communication processor; a first radio frequency front-end (RFFE) circuit connected to the at least one RFIC and configured to process a first signal corresponding to a first communication network; and a second RFFE circuit connected to the at least one RFIC and configured to process a second signal corresponding to a second communication network, wherein the communication processor is configured to: identify information related to a power class from information that is received from the first communication network; identify a transmission path for a third signal to be transmitted to the first communication network based on the information related to the power class; and transmit, via the first RFFE circuit or the second RFFE circuit, the third signal to the first communication network according to the identified transmission path.

According to various embodiments, the information related to the power class may be identified from a master information block (MIB) or a system information block (SIB) that is transmitted from the first communication network.

Figure 9:
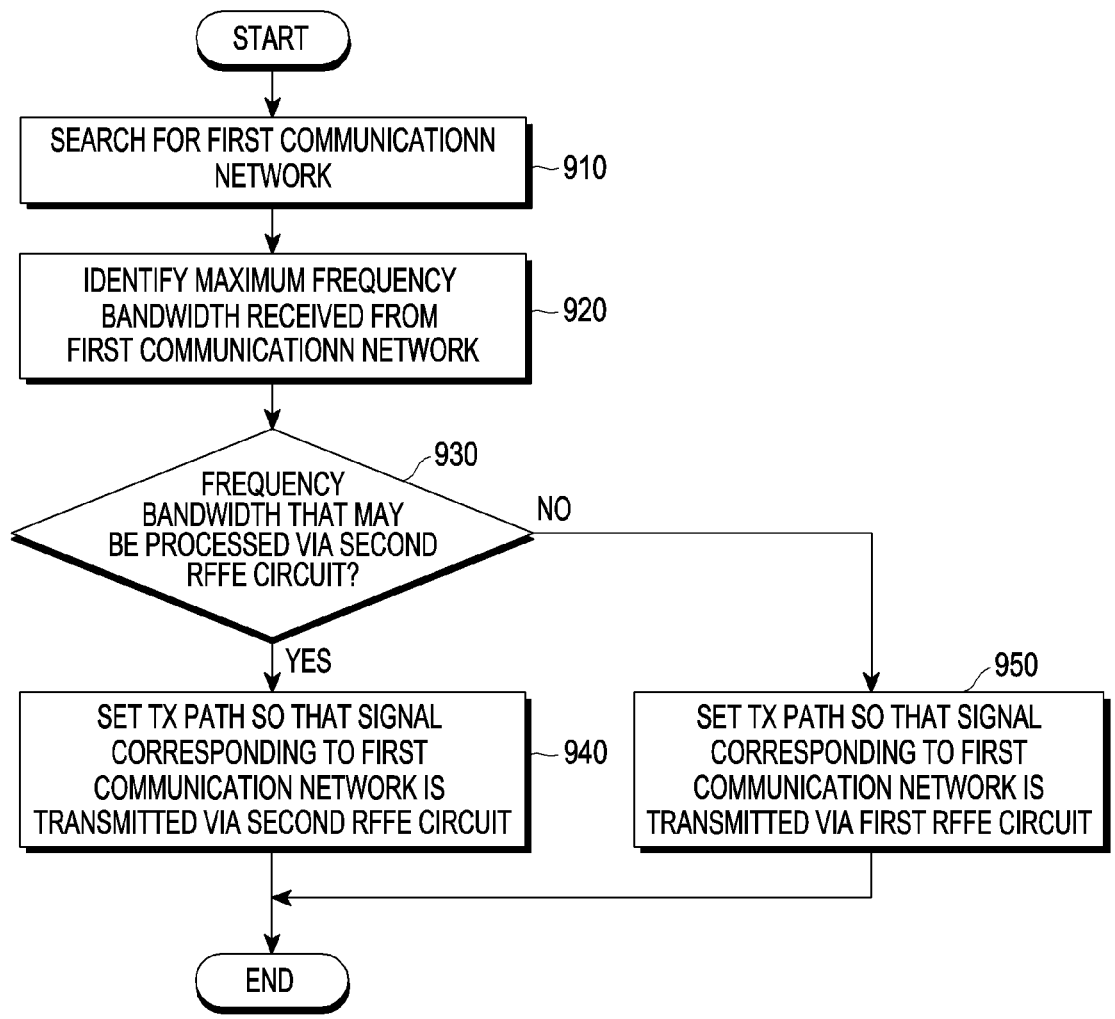
FIG. 9 is a flowchart for describing an operating method of an electronic device according to various embodiments.
Figure 13:
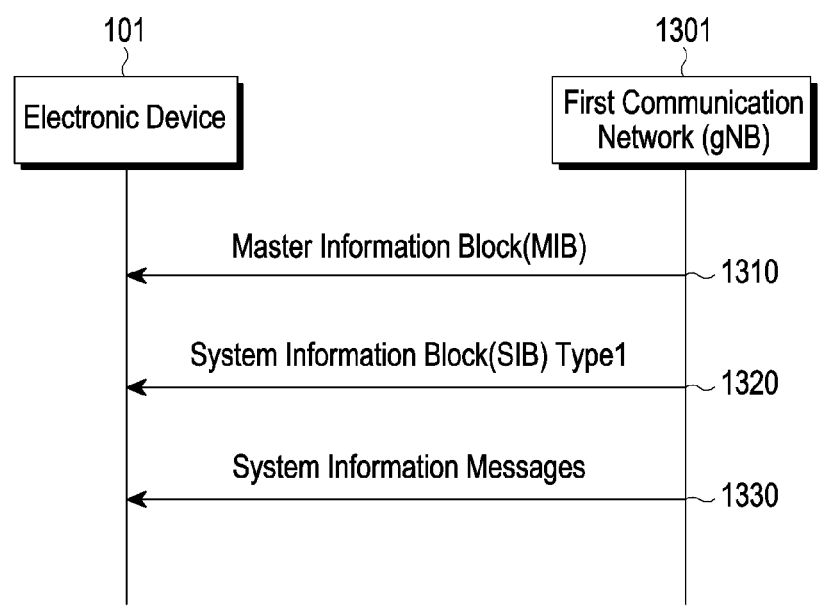
FIG. 13 is a flowchart for describing a signal transmission/reception procedure between an electronic device and a communication network according to various embodiments.

FIG. 9 is a flowchart for describing an operating method of an electronic device according to various embodiments. An operation in FIG. 9 to be described below may be applied to an electronic device in one of FIGS. 4A, 4B, and 4C. FIG. 13 is a flowchart for describing a signal transmission/reception procedure between an electronic device and a communication network according to various embodiments. Referring to FIG. 9, according to various embodiments, an electronic device (an electronic device 101 in FIG. 1) (e.g., a communication processor 260 of the electronic device) may search for a base station (gNB) of a first communication network (e.g., a 5G communication network) in operation 910.

According to various embodiments, in operation 920, the electronic device may identify a maximum frequency bandwidth received from the first communication network. The maximum frequency bandwidth may be identified from at least one of a master information block (MIB) or a system information block (SIB) received from the first communication network (e.g., the base station). Detailed embodiments for identifying the maximum frequency bandwidth from the at least one of the MIB and SIB will be described later.

Referring to FIG. 13, when an electronic device 101 searches for a first communication network 1301 (e.g., a base station (gNB)), the electronic device 101 may receive an MIB in operation 1310 from the first communication network 1301 in operation 1310, may receive an SIB 1 from the first communication network 1301 in operation 1320, and may receive system information messages from the first communication network 1301 in operation 1330. For example, the system information messages may include other SIBs (e.g., an SIB 2 to an SIB 12).

According to various embodiments, a signal received by the electronic device 101 is a signal transmitted from the first communication network 1301 (e.g., the base station (gNB)), and may include at least one information used for a cell search. For example, the signal received in the electronic device 101 may include a signal for obtaining synchronization with a neighbor base station (or cell) (e.g., a primary synchronization signal (PSS) or a secondary synchronization signal (SSS)) or system information (e.g., a master information block (MIB) or a system information block (SIB)). According to various embodiments, the electronic device 101 may obtain at least one of frequency synchronization, symbol synchronization, or frame synchronization for a communication with a corresponding base station based on the PSS and/or the SSS which are received from the neighbor base station (e.g., the first communication network 1301). According to various embodiments, the electronic device 101 may obtain cell identification information (cell ID) (e.g., a physical cell ID) of a base station which transmits a corresponding signal based on the PSS and/or the SSS received from the neighbor base station. According to various embodiments, the electronic device 101 may identify system information received from the neighbor base station based on the PSS and/or the SSS which are received from the neighbor base station.

For example, an MIB among system information may include at least one of information about a downlink cell bandwidth, information about physical hybrid-ARQ indicator channel (PHICH) configuration of a cell, and a system frame number (SFN), and an SIB among the system information may include at least one of operator information of the corresponding cell, configuration information of UL/DL subframe allocation, scheduling information for the SIB, information required for a terminal to access the cell (e.g., information about a uplink cell bandwidth (e.g., maximum frequency bandwidth information), a random access parameter, and a parameter related to uplink power control), and cell reselection-related information.

According to various embodiments, the maximum frequency bandwidth information may be identified via the following SIB 1 among system information among information received from a communication network (e.g., a base station).

NR5G RRC OTA Packet --
BCCH_DL_SCH/SystemInformationBlockType1
Subscription ID = 1
Pkt Version = 8
RRC Release Number.Major.minor = 15.6.0
Radio Bearer ID = 0, Physical Cell ID = 0
Freq = 527070
Sfn = 0
PDU Number = BCCH_DL_SCH Message, Msg Length = 129
SIB Mask in SI = 0x02
Interpreted PDU
value BCCH-DL-SCH-Message :: =
{

-continued

```
message c1 : systemInformationBlockType1 :
{
    cellSelectionInfo
    {
        q-RxLevMin -70,
        q-RxLevMinSUL -70,
        q-QualMin -20
    },
    servingCellConfigCommon
    {
        downlinkconfigcommon
        {
            frequencyInfoDL
            {
                frequencyBandList
                {
                    freBandIndicatiorNR 41,
                    {
                        {
                            additionalPmax 23
                            addtionalSpectumEmission 0
                        }
                    }
                }
            },
            offsetToPointA 1012,
            scs = SpecificCarrierList
            {
                {
                    offsetToCarrier 504
                    subcarrierSpacing kHz 30,
                    carrierBandwidth 162
                }
            }
        }
    }.
```

According to various embodiments, based on information included in the SIB1, it may be identified that a corresponding frequency band is an N41 band of NR and maximum power allowed in the base station of the corresponding communication network is 23 dBm. It may be identified that the corresponding base station supports a PC 3 based on a fact that the maximum power allowed in the base station is 23 dBm.

In addition, SCS and max RB (e.g., the maximum number of RBs) provided by the base station of the communication network may be identified from the information included in the SIB 1. For example, referring to the information included in the SIB 1, it may be identified that the SCS is 30 kHz from "subcarrierSpacing kHz30," and the max RB is 162 from "carrierBandwidth 162."

According to various embodiments, the electronic device 101 may identify a maximum frequency bandwidth which is supportable in the first communication network 1301 if the SCS is 30 kHz by referring to Table 5 according to the SCS and the max RB (e.g., the maximum number of RBs).

TABLE 5

| CBW | max RB | Equation | RIV Calculation | location and BW |
|---|---|---|---|---|
| 20 | 51 | (1) | 275*(51 − 1) + 0 | 13750 |
| 40 | 106 | (1) | 275*(106 − 1) + 0 | 28875 |
| 50 | 133 | (1) | 275*(133 − 1) + 0 | 3630 |
| 60 | 162 | (2) | 275*(275 − 162 + 1) + (275 − 1 − 0) | 31624 |
| 80 | 217 | (2) | 275*(275 − 217 + 1) + (275 − 1 − 0) | 16499 |
| 100 | 273 | (2) | 275*(275 − 273 + 1) + (275 − 1 − 0) | 1099 |

Referring to Table 5, if the SCS is 30 kHz and the max RB (e.g., the maximum number of RBs) is 162, it may be identified that a channel bandwidth (CBW) is 60 MHz based on Equation (2). The CBW calculated as described above may correspond to a maximum frequency bandwidth (max BW) which is supportable in the first communication network 1301. Here, it is noted that the term "maximum frequency bandwidth" may be used interchangeably with the term "max BW." According to various embodiments, the electronic device 101 may identify maximum frequency bandwidth information from a communication network before performing a RACH procedure with a base station. According to various embodiments, Table 5 may be stored in a memory 130 of the electronic device 101, and the max BW may be identified based on Table 5 from a max BW included in an SIB1 which the electronic device 101 receives from the communication network (e.g., the base station).

According to various embodiments, a maximum frequency bandwidth which is supportable in the first communication network 1301 in a case that the SCS is 15 kHz and a maximum frequency bandwidth which is supportable in the first communication network 1301 in a case that the SCS is 120 kHz may be identified via Tables 6 and 7, respectively.

TABLE 6

| CBW | max RB | Equation | RIV Calculation | location and BW |
|---|---|---|---|---|
| 10 | 52 | (1) | 275*(52 − 1) + 0 | 14025 |
| 20 | 106 | (1) | 275*(106 − 1) + 0 | 28875 |
| 40 | 216 | (2) | 275*(275 − 216 + 1) + (275 − 1 − 0) | 16774 |
| 50 | 270 | (2) | 275*(275 − 270 + 1) + (275 − 1 − 0) | 1924 |

TABLE 7

| CBW | max RB | Equation | RIV Calculation | location and BW |
|---|---|---|---|---|
| 50 | 32 | (1) | 275*(32 − 1) + 0 | 8525 |
| 100 | 66 | (1) | 275*(66 − 1) + 0 | 17875 |
| 200 | 132 | (1) | 275*(132 − 1) + 0 | 36025 |
| 400 | 264 | (2) | 275*(275 − 264 + 1) + (275 − 1 − 0) | 3574 |

According to various embodiments, in operation 920, the electronic device may identify the maximum frequency bandwidth from system information received from the first communication network (e.g., the base station (gNB)).

According to various embodiments, in operation 930, if the electronic device identifies that the identified maximum frequency bandwidth is a frequency bandwidth which may be processed via a second RFFE circuit (e.g., a second RFFE 432 in FIG. 4A) (operation 930-Yes), in operation 940, the electronic device may set a Tx path so that a signal to be transmitted to the first communication network is transmitted via the second RFFE circuit.

According to various embodiments, in operation 930, if the electronic device identifies that the identified maximum frequency bandwidth is a frequency bandwidth which may not be processed via the second RFFE circuit (operation 930-No), in operation 950, the electronic device may set a Tx path so that a signal to be transmitted to the first communication network is transmitted via a first RFFE circuit (e.g., a first RFFE 431 in FIG. 4A).

Figure 10:
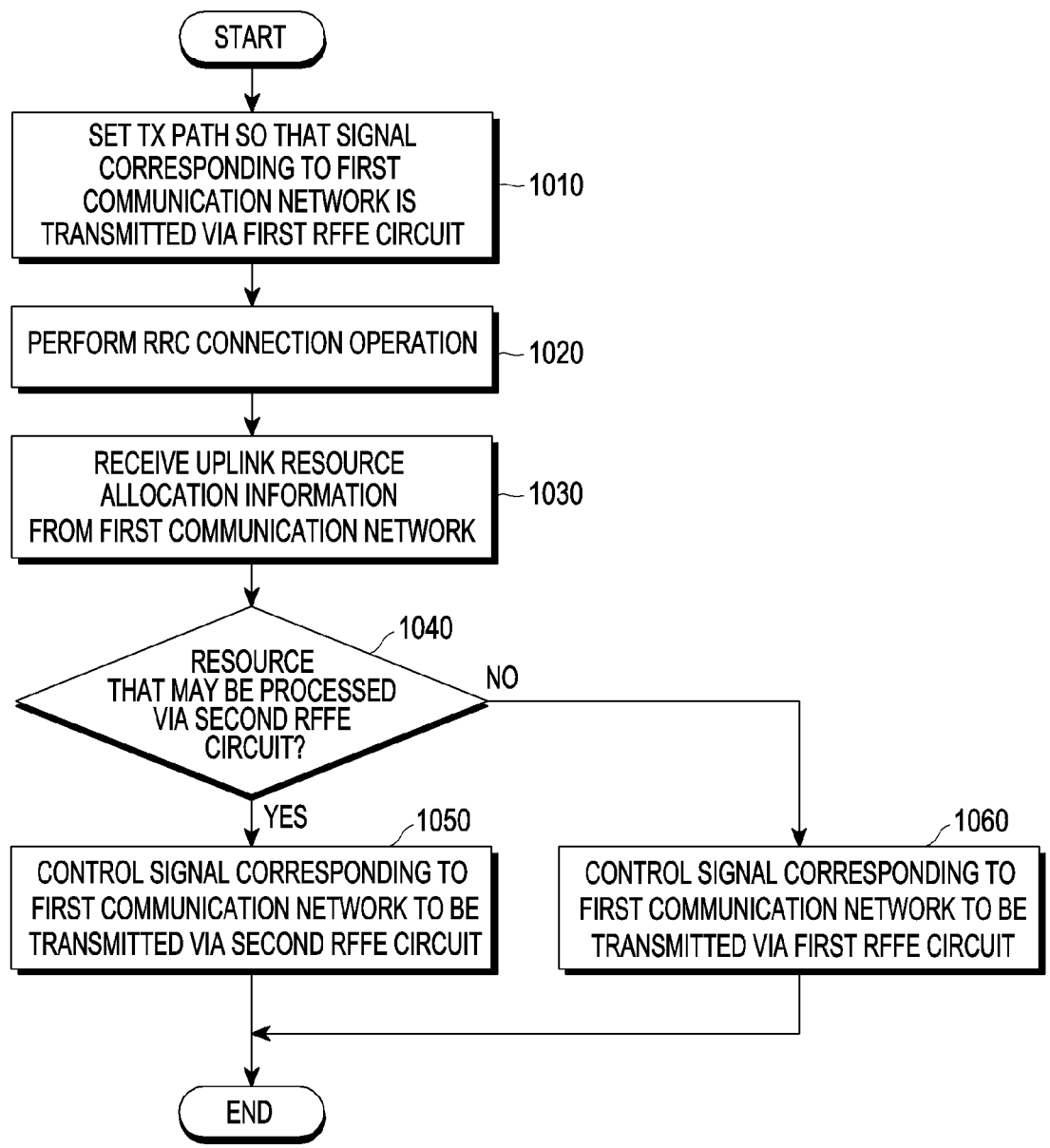
FIG. 10 is a flowchart for describing an operating method of an electronic device according to various embodiments.

FIG. 10 is a flowchart for describing an operating method of an electronic device according to various embodiments. An operation in FIG. 10 to be described below may be applied to an electronic device in one of FIGS. 4A, 4B, and 4C. Referring to FIG. 10, according to various embodiments, in operation 1010, an electronic device (e.g., an electronic device 101 in FIG. 1) (e.g., a communication processor 260 of the electronic device) may set a Tx path so that a signal corresponding to a first communication network is transmitted via a first RFFE circuit according to a result of an operation in FIG. 9.

According to various embodiments, the electronic device may perform an RRC connection operation with the first communication network (e.g., a base station) in operation 1020.

According to various embodiments, in operation 1030, the electronic device may identify uplink resource allocation information from information received from the first communication network. For example, the electronic device may receive a physical downlink control channel (PDCCH) from the first communication network, and may identify uplink resource allocation information by identifying downlink control information (DCI) included in the PDCCH.

According to various embodiments, upon identifying that a uplink resource which corresponds to the identified uplink resource allocation information is a resource which may be processed (e.g., a bandwidth which may be processed) via a second RFFE circuit (e.g., a second RFFE 432 in FIG. 4A) in operation 1040 (operation 1040-Yes), the electronic device may set a Tx path so that a signal to be transmitted to the first communication network is transmitted via the second RFFE circuit in operation 1050.

According to various embodiments, upon identifying that the uplink resource which corresponds to the identified uplink resource allocation information is a resource which may not be processed (e.g., a bandwidth which may not be processed) via the second RFFE circuit in operation 1040 (operation 1040-No), the electronic device may set a Tx path so that a signal to be transmitted to the first communication network is transmitted via a first RFFE circuit (e.g., a first RFFE 431 in FIG. 4A) in operation 1060.

Figure 11:
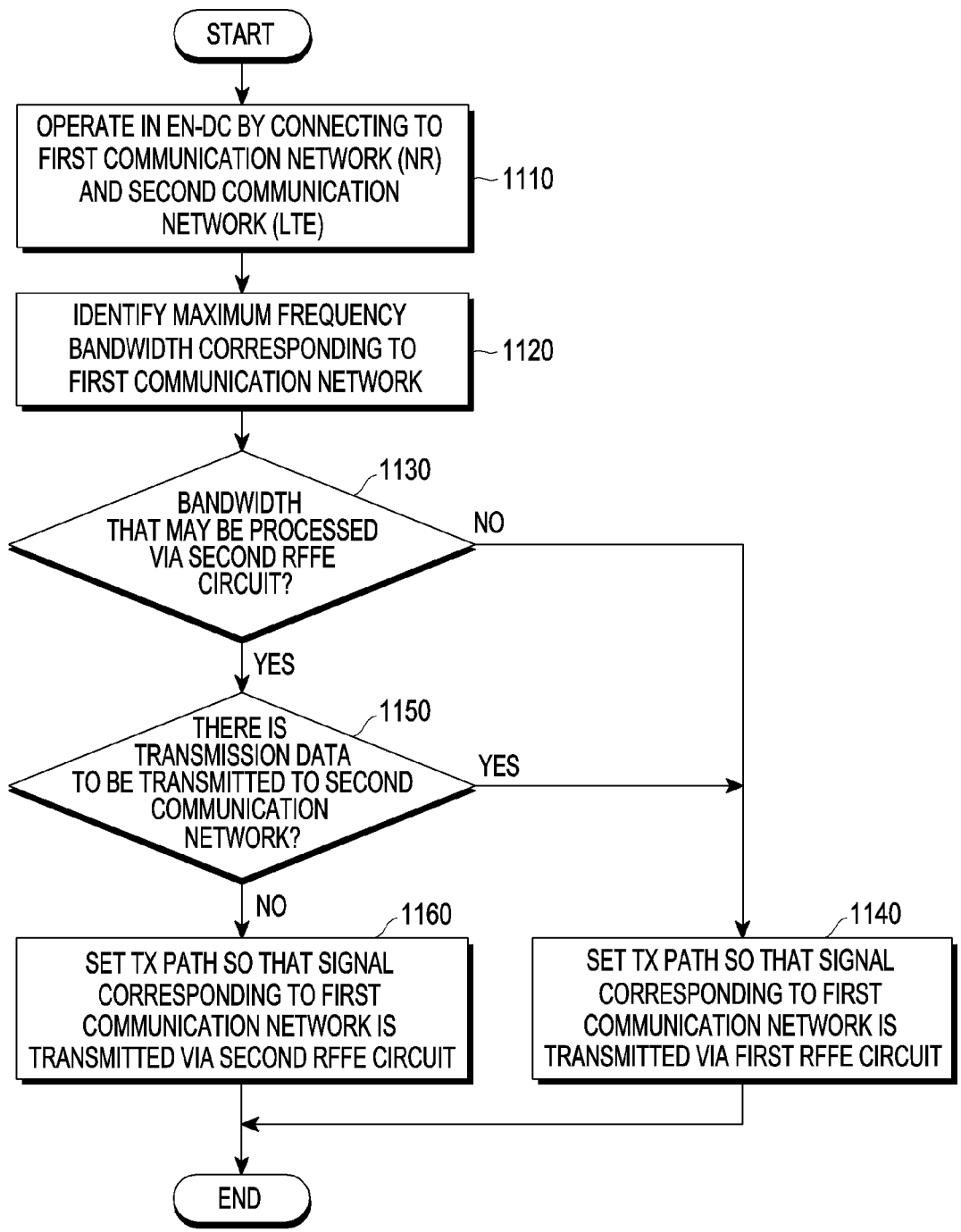
FIG. 11 is a flowchart for describing an operating method of an electronic device according to various embodiments.
Figure 14:
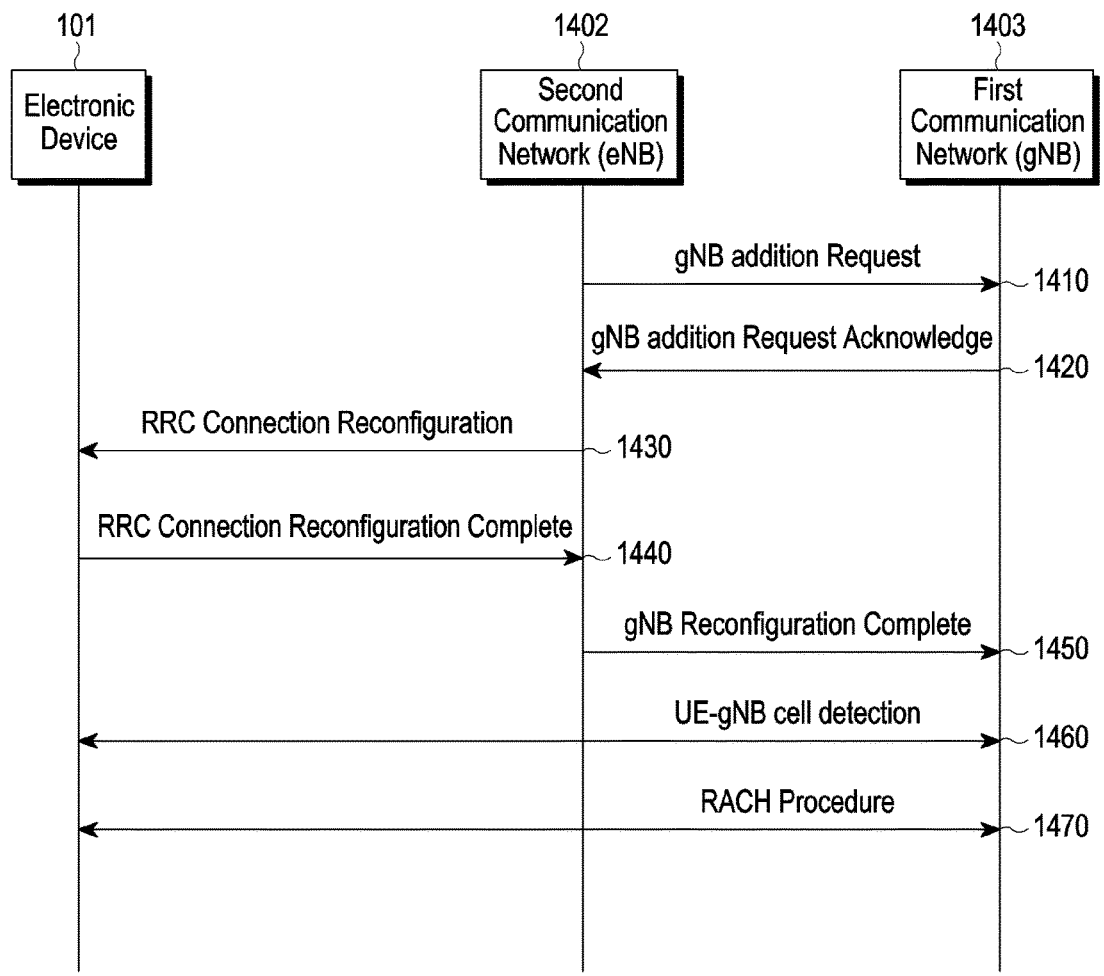
FIG. 14 is a flowchart for describing a signal transmission/reception procedure between an electronic device and a communication network according to various embodiments.

FIG. 11 is a flowchart for describing an operating method of an electronic device according to various embodiments. An operation in FIG. 11 to be described below may be applied to an electronic device in FIG. 4C. FIG. 14 is a flowchart for describing a signal transmission/reception procedure between an electronic device and a communication network according to various embodiments.

Referring to FIG. 11, according to various embodiments, an electronic device (e.g., an electronic device 101 in FIG. 1) (e.g., a communication processor 260 of the electronic device) may operate in EN-DC by connecting to a first communication network (e.g., NR) and a second communication network (e.g., LTE) at the same time in operation 1110.

Referring to FIG. 14, in a state in which an electronic device 101 is connected to a second communication network 1402 (e.g., an eNB), the second communication network 1402 may transmit a gNB addition Request to a first communication network 1403 (e.g., a gNB) in operation 1410. The first communication network 1403 may transmit a gNB addition Request Acknowledge to the second communication network 1402 in operation 1420.

According to various embodiments, the second communication network 1402 may transmit RRC connection reconfiguration to the electronic device 101 in operation 1430. The electronic device 101 may transmit RRC connection reconfiguration complete to the second communication network 1402 in operation 1440. The second communication network 1402 may transmit gNB Reconfiguration Complete to the first communication network 1403 in operation 1450.

The electronic device 101 may operate in EN-DC via the first communication network 1403 and the second communication network 1402 by performing UE-gNB cell detection with the first communication network 1403 in operation 1460, and performing an RACH procedure in operation 1470.

According to various embodiments, the RRC Connection Reconfiguration in operation 1430 may include band/bandwidth (BW) information for the first communication network 1403 to be connected as follows.

```
LTE RRC OTA Packet -- DL DCCH/RRCConnectionReconfiguration
Subscription ID = 1
Pkt Version = 26
RRC Release Number.Major.minor = 15.5.0
Radio Bearer ID = 1, Physical Cell ID = 0
Freq = 2525
SysFrameNum = N/A, SubFrameNum = 0
PDU Number = DL_DCCH Message, Msg Length = 313
SIB Mask in SI = 0x00
physicalCellGroupconfig
{
  p-NR-FR1 30,
  pdsch-HARQ-ARK-Codebook dynamic
},
spCellConfig
{
  servCellIndex 1,
  reconfigurationWithSync
  {
    physCellId 0,
    downlinkConfigcommon
    {
      frequencyInfoDL
      {
        absoluteFrequencySSB 392000,
        frequencyBandList
        {
          2
        },
        absoluteFrequencyPointA
        scs-SpecificCarrierList
        {
          {
            ofsetToCarrier 0,
            subcarrierSpacing kHz 15,
            carrierBandwidth 52
          }
        }
      },
      initialDownlinkBWP
      {
        genericParameters
        {
          locatonAndBandwidth 14025,
          subcarrierSpacing kHz 15
        }.
```

According to various embodiments, from information included in the RRC connection reconfiguration, SCS and a max RB (e.g., the maximum number of RBs) provided by a base station of the first communication network may be identified. For example, referring to the information included in the RRC connection reconfiguration, it may be identified that the SCS is 15 kHz from "subcarrierSpacing kHz15," and it may be identified that the max RB is 52 from "carrierBandwidth 52."

According to various embodiments, if the SCS is 15 kHz, the electronic device 101 may identify a maximum frequency bandwidth which is supportable in the first communication network 1403 by referring to Table 6 according to the SCS and the max RB (e.g., the maximum number of RBs).

Referring to Table 6, if the SCS is 15 kHz and the max RB (e.g., the maximum number of RBs) is 52, it may be identified that a CBW is 10 MHz based on Equation (1). The CBW calculated as described above may correspond to a maximum frequency bandwidth (max BW) which is supportable in the first communication network 1403.

Referring back to FIG. 11, according to various embodiments, the electronic device may identify a maximum frequency bandwidth for the first communication network as described above in operation 1120.

According to various embodiments, upon identifying that the identified maximum frequency bandwidth is a frequency bandwidth which may be processed via a second RFFE circuit (e.g., a second RFFE 432 in FIG. 4A) (operation 1130-Yes), the electronic device may identify whether there is transmission data to be transmitted to the second communication network in operation 1150.

According to various embodiments, if there is no transmission data to be transmitted to the second communication network (operation 1150-No), the electronic device may set a Tx path so that a signal to be transmitted to the first communication network is transmitted via the second RFFE circuit in operation 1160.

According to various embodiments, if it is identified that the identified maximum frequency bandwidth is a frequency bandwidth which may not be processed via the second RFFE circuit (operation 1130-No), or if there is the transmission data to be transmitted to the second communication network (operation 1150-Yes), the electronic device may set a Tx path so that a signal to be transmitted to the first communication network is transmitted via the first RFFE circuit in operation 1140.

Figure 12:
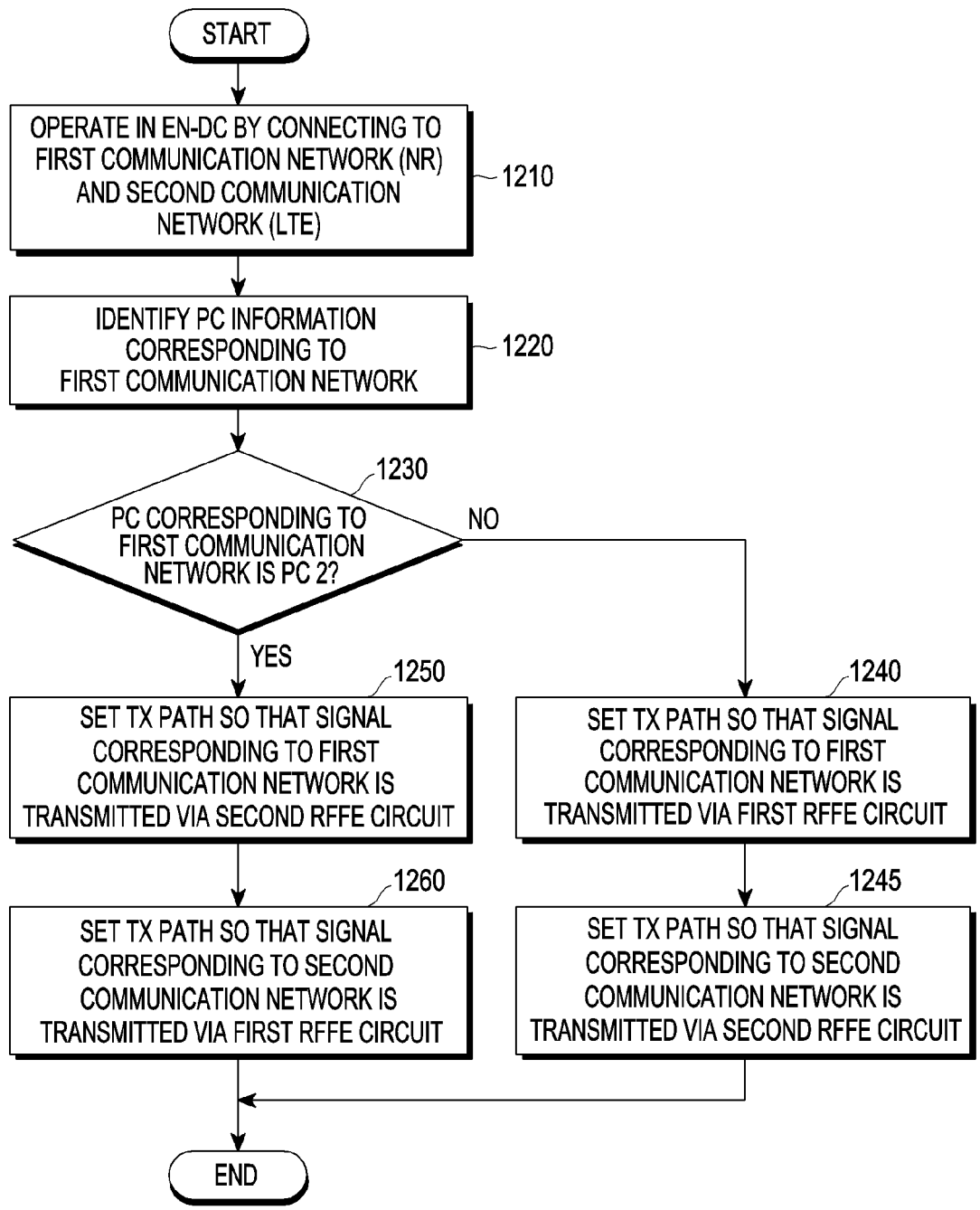
FIG. 12 is a flowchart for describing an operating method of an electronic device according to various embodiments.

FIG. 12 is a flowchart for describing an operating method of an electronic device according to various embodiments. An operation in FIG. 12 to be described below may be applied to an electronic device in FIG. 4C. Referring to FIG. 12, an electronic device (an electronic device 101 in FIG. 1) (e.g., a communication processor 260 of the electronic device) may operate in EN-DC by connecting to a first communication network (e.g., NR) and a second communication network (e.g., LTE) at the same time in operation 1210.

According to various embodiments, the first communication network (e.g., the NR) may be configured to transmit a signal via a first RFFE circuit, and the second communication network (e.g., the LTE) may be configured to transmit a signal via a second RFFE circuit. As described above, a RFFE circuit supporting the NR (e.g., the first RFFE circuit) has higher path loss than a RFFE circuit supporting the LTE (e.g., the second RFFE circuit), so it may be difficult for the RFFE circuit supporting the NR (e.g., the first RFFE circuit) to support transmission with power of PC 2 (e.g., 26 dBm). According to various embodiments, if the first communication network (e.g., the NR) is set to the PC 2 based on information received from a base station of the first communication network (e.g., the NR), a transmission signal of the first communication network (e.g., the NR) may be transmitted via the second RFFE circuit supporting the transmission with the power of the PC 2.

According to various embodiments, in operation 1220, the electronic device 101 may identify information related to a power class (e.g., maximum power information corresponding to a specific PC) for the first communication network. The electronic device 101 may identify a supportable PC from the information related to the power class.

According to various embodiments, the electronic device 101 may receive SIB 1 from a base station (gNB) of the first communication network. As described above, the electronic device 101 may identify a corresponding frequency band (e.g., an N41 band) from information included in the SIB 1, and may identify that maximum power allowed in a base station of a corresponding communication network is 23 dBm or 26 dBm as the information related to the power class. From a fact that the maximum power allowed in the base station is 23 dBm, it may be known that the base station supports a PC 3. From a fact that the maximum power allowed in the base station is 26 dBm, it may be known that the base station supports the PC 2.

According to various embodiments, if it is identified that the identified PC is the PC 2 in operation 1230 (operation 1230-Yes), the electronic device 101 may set a Tx path so that a signal to be transmitted to the first communication network is transmitted via the second RFFE circuit in operation 1250, and may set a Tx path so that a signal to be transmitted to the second communication network is transmitted via the first RFFE circuit (e.g., a first RFFE 431 in FIG. 4A) in operation 1260.

Upon identifying that the PC corresponding to the information related to the power class is not a PC which may be provided via the second RFFE circuit (operation 1230-No), the electronic device 101 may set a Tx path so that the signal to be transmitted to the first communication network is transmitted via the first RFFE circuit in operation 1240, and may set a Tx path so that the signal to be transmitted to the second communication network is transmitted via the second RFFE circuit in operation 1245.

According to one of various embodiments, a method to set a transmission path in an electronic device comprising a communication processor, at least one radio frequency integrated circuit (RFIC) connected to the communication processor, a first radio frequency front-end (RFFE) circuit connected to the at least one RFIC and configured to process a signal which corresponds to a first communication network, and a second RFFE circuit connected to the at least one RFIC and configured to process a first signal corresponding to a second communication network may comprise identifying a maximum frequency bandwidth that is supportable in the first communication network based on information received from the first communication network; and based on a result that the identified maximum frequency bandwidth is identified as a frequency bandwidth that is capable of being processed via the second RFFE circuit, transmitting, via the second RFFE circuit, a third signal to the first communication network.

According to various embodiments, the maximum frequency bandwidth may be identified from a master information block (MIB) or a system information block (SIB) that is transmitted from the first communication network.

According to various embodiments, the method may further comprise identifying uplink resource allocation information from the information that is received from the first communication network; and if a size of an uplink frequency resource allocated according to the identified uplink resource allocation information is identified as a size of a frequency resource that is capable of being processed via the second RFFE circuit, transmitting, via the second RFFE circuit, the third signal to the first communication network.

According to various embodiments, the size of the uplink frequency resource may be identified by a number of resource blocks.

According to various embodiments, the uplink resource allocation information may be identified from a downlink control information (DCI) transmitted from the first communication network.

According to various embodiments, the method may further comprise identifying whether there is a fourth signal to be transmitted to the second communication network; and if there is no fourth signal to be transmitted to the second communication network, transmitting, via the second RFFE circuit, the third signal to the first communication network.

According to various embodiments, the method may further comprise when transmitting, via the second RFFE circuit, the third signal to the first communication network, transmitting, via the first RFFE circuit, a fourth signal to the second communication network.

According to various embodiments, the first RFFE circuit may include a greater path loss than the second RFFE circuit.

According to one of various embodiments, a method to set a transmission path in an electronic device comprising a communication processor, at least one radio frequency integrated circuit (RFIC) connected to the communication processor, a first radio frequency front-end (RFFE) circuit connected to the at least one RFIC and configured to process a first signal corresponding to a first communication network, and a second RFFE circuit connected to the at least one RFIC and configured to process a second signal corresponding to a second communication network may comprise identifying information related to a power class from information that is received from the first communication network; identifying a transmission path for a third signal to be transmitted to the first communication network based on the information related to the power class; and transmitting, via the first RFFE circuit or the second RFFE circuit, the third signal to the first communication network according to the identified transmission path.

According to various embodiments, the information related to the power class may be identified from a master information block (MIB) or a system information block (SIB) that is transmitted from the first communication network.

According to various embodiments, an electronic device supporting a plurality of communication networks may control to transmit a signal via a transmission path (e.g., a transmission path having a relatively small path loss) other than a transmission path which is set by default corresponding to each communication network in consideration of a frequency bandwidth or power class information of each communication network, thereby minimizing a consumed current or increasing maximum power to transmit a transmission signal with the increased maximum power.

According to various embodiments, an electronic device supporting a plurality of communication networks may transmit a signal via a transmission path having a relatively high priority in consideration of a frequency bandwidth or power class information of each communication network, thereby decreasing a consumed current of the electronic device and supporting a power class of high power. In addition, according to various embodiments, it is possible to increase maximum transmission power, thereby increasing a range of an area in which a communication with a network is possible, and increasing uplink data throughput according to an increase in power.

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a task performing device). For example, a processor of the machine (e.g., the master device or the task performing device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
   a communication processor;
   at least one radio frequency integrated circuit (RFIC) connected to the communication processor;
   a first radio frequency front-end (RFFE) circuit connected to the at least one RFIC and configured to process a first signal corresponding to a first communication network; and
   a second RFFE circuit connected to the at least one RFIC and configured to process a second signal corresponding to a second communication network,
   wherein the communication processor is configured to:
      identify a maximum frequency bandwidth that is supportable in the first communication network based on information received from the first communication network; and
      if the identified maximum frequency bandwidth is identified as a frequency bandwidth that is capable of being processed via the second RFFE circuit, transmit, via the second RFFE circuit, a third signal to the first communication network.

2. The electronic device of claim 1, wherein the maximum frequency bandwidth is identified from a master information block (MIB) or a system information block (SIB) that is transmitted from the first communication network.

3. The electronic device of claim 1, wherein the communication processor is further configured to:
   identify uplink resource allocation information from the information that is received from the first communication network; and
   if a size of an uplink frequency resource allocated according to the identified uplink resource allocation information is identified as a size of a frequency resource that is capable of being processed via the second RFFE circuit, transmit, via the second RFFE circuit, the third signal to the first communication network.

4. The electronic device of claim 3, wherein the size of the uplink frequency resource is identified by a number of resource blocks.

5. The electronic device of claim 3, wherein the uplink resource allocation information is identified from a downlink control information (DCI) transmitted from the first communication network.

6. The electronic device of claim 1, wherein the communication processor is further configured to:
identify whether there is a fourth signal to be transmitted to the second communication network; and
if there is no fourth signal to be transmitted to the second communication network, transmit, via the RFFE circuit, the third signal to the first communication network.

7. The electronic device of claim 1, wherein the communication processor is further configured to:
when transmitting, via the second RFFE circuit, the third signal to the first communication network, transmitting, via the first RFFE circuit, a fourth signal to the second communication network.

8. The electronic device of claim 1, wherein the first RFFE circuit includes a path loss greater than the second RFFE circuit.

9. A method to set a transmission path in an electronic device comprising a communication processor, at least one radio frequency integrated circuit (RFIC) connected to the communication processor, a first radio frequency front-end (RFFE) circuit connected to the at least one RFIC and configured to process a first signal corresponding to a first communication network, and a second RFFE circuit connected to the at least one RFIC and configured to process a second signal corresponding to a second communication network, the method comprising:
identifying a maximum frequency bandwidth that is supportable in the first communication network based on information received from the first communication network; and
based on a result that the identified maximum frequency bandwidth is identified as a frequency bandwidth that is capable of being processed via the second RFFE circuit, transmitting, via the second RFFE circuit, a third signal to the first communication network.

10. The method of claim 9, wherein the maximum frequency bandwidth is identified from a master information block (MIB) or a system information block (SIB) that is transmitted from the first communication network.

11. The method of claim 9, further comprising:
identifying uplink resource allocation information from the information that is received from the first communication network; and
if a size of an uplink frequency resource allocated according to the identified uplink resource allocation information is identified as a size of a frequency resource that is capable of being processed via the second RFFE circuit, transmitting, via the second RFFE circuit, the third signal to the first communication network.

12. The method of claim 11, wherein the size of the uplink frequency resource is identified by a number of resource blocks.

13. The method of claim 11, wherein the uplink resource allocation information is identified from a downlink control information (DCI) transmitted from the first communication network.

14. The method of claim 9, further comprising:
identifying whether there is a fourth signal to be transmitted to the second communication network; and
if there is no fourth signal to be transmitted to the second communication network, transmitting, via the second RFFE circuit, the third signal to the first communication network.

15. The method of claim 9, further comprising:
when transmitting, via the second RFFE circuit, the third signal to the first communication network, transmitting, via the first RFFE circuit, a fourth signal to the second communication network.

16. The method of claim 9, wherein the first RFFE circuit includes a path loss greater than the second RFFE circuit.

17. An electronic device, comprising:
a communication processor;
at least one radio frequency integrated circuit (RFIC) connected to the communication processor;
a first radio frequency front-end (RFFE) circuit connected to the at least one RFIC and configured to process a first signal corresponding to a first communication network; and
a second RFFE circuit connected to the at least one RFIC and configured to process a second signal corresponding to a second communication network,
wherein the communication processor is configured to:
identify information related to a power class based on information that is received from the first communication network;
identify a transmission path for a third signal to be transmitted to the first communication network based on the information related to the power class; and
transmit, via the first RFFE circuit or the second RFFE circuit, the third signal to the first communication network according to the identified transmission path.

18. The electronic device of claim 17, wherein the information related to the power class is identified from a master information block (MIB) or a system information block (SIB) that is transmitted from the first communication network.

19. A method to set a transmission path in an electronic device comprising a communication processor, at least one radio frequency integrated circuit (RFIC) connected to the communication processor, a first radio frequency front-end (RFFE) circuit connected to the at least one RFIC and configured to process a first signal corresponding to a first communication network, and a second RFFE circuit connected to the at least one RFIC and configured to process a second signal corresponding to a second communication network, the method comprising:
identifying information related to a power class based on information that is received from the first communication network;
identifying a transmission path for a third signal to be transmitted to the first communication network based on the information related to the power class; and
transmitting, via the first RFFE circuit or the second RFFE circuit, the third signal to the first communication network according to the identified transmission path.

20. The method of claim 19, wherein the information related to the power class is identified from a master information block (MIB) or a system information block (SIB) that is transmitted from the first communication network.

\* \* \* \* \*